US012738708B2

(12) United States Patent
Boulanger et al.

(10) Patent No.: US 12,738,708 B2
(45) Date of Patent: Sep. 15, 2026

(54) FIBER LASER SYSTEM

(71) Applicants: UNIVERSITÉ LAVAL, Québec (CA); CEGEP GARNEAU, Québec (CA)

(72) Inventors: Vincent Boulanger, Québec (CA); Michel Piché, Québec (CA); Martin Bernier, Québec (CA); Michel Olivier, Québec (CA)

(73) Assignees: UNIVERSITÉ LAVAL, Quebec (CA); CEGEP GARNEAU, Quebec (CA)

( * ) Notice: Subject to any disclaimer, the term of this patent is extended or adjusted under 35 U.S.C. 154(b) by 795 days.

(21) Appl. No.: 17/919,553

(22) PCT Filed: Apr. 21, 2021

(86) PCT No.: PCT/CA2021/050548
§ 371 (c)(1),
(2) Date: Oct. 18, 2022

(87) PCT Pub. No.: WO2021/237334
PCT Pub. Date: Dec. 2, 2021

(65) Prior Publication Data
US 2023/0163553 A1 May 25, 2023

Related U.S. Application Data

(60) Provisional application No. 63/014,268, filed on Apr. 23, 2020.

(51) Int. Cl.
*H01S 3/067* (2006.01)
*H01S 3/094* (2006.01)
(Continued)

(52) U.S. Cl.
CPC ........ *H01S 3/0675* (2013.01); *H01S 3/06791* (2013.01); *H01S 3/094003* (2013.01); *H01S 3/09415* (2013.01); *H01S 3/1112* (2013.01)

(58) Field of Classification Search
CPC ............... H01S 3/0675; H01S 3/06791; H01S 3/094003; H01S 3/09415; H01S 3/1112;
(Continued)

(56) References Cited

U.S. PATENT DOCUMENTS 5,815,518 A * 9/1998 Reed ....................... H01S 3/302 359/345
RE35,962 E * 11/1998 Ball ...................... H01S 3/0675 372/102

(Continued)

FOREIGN PATENT DOCUMENTS

CN 110544863 6/2021
WO 2011009198 1/2011

(Continued)

OTHER PUBLICATIONS

Regelskis, Kęstutis et al. "Ytterbium-doped fiber ultrashort pulse generator based on self-phase modulation and alternating spectral filtering." Optics letters 40 22 (2015): 5255-8.

(Continued)

*Primary Examiner* — Xinning(Tom) Niu
(74) *Attorney, Agent, or Firm* — Reno Lessard; Norton Rose Fulbright Canada LLP

(57) ABSTRACT

There is described a fiber laser system generally having a pump laser generating a pump laser beam; and a length of optical fiber optically coupled to the pump laser, the length of optical fiber having: a laser cavity having a cavity path, a first fiber Bragg grating having a first reflectivity profile, a second filter having a second filter profile, and an optical gain region between the first fiber Bragg grating and the second filter along the cavity path, the first reflectivity profile being spectrally detuned from the second filter profile, the first fiber Bragg grating having a first refractive index profile comprising a full width at half maximum bandwidth of at least 0.2 nm and a Gaussian-like apodiza- (Continued)

tion, wherein, upon pumping of the optical gain region with the pump laser beam and mode locking of the laser cavity, optical pulses are circulated along the cavity path; and an output.

20 Claims, 16 Drawing Sheets

(51) Int. Cl.
*H01S 3/0941* (2006.01)
*H01S 3/1112* (2023.01)

(58) Field of Classification Search
CPC .. H01S 3/0057; H01S 3/06712; H01S 3/0826; H01S 3/094011; H01S 3/094015; H01S 3/1053; H01S 3/1055; H01S 2301/04; H01S 3/06725; H01S 3/1118; H01S 3/1608; H01S 2301/085
See application file for complete search history.

(56) References Cited

U.S. PATENT DOCUMENTS

| | | | | |
|---|---|---|---|---|
| 5,991,068 | A * | 11/1999 | Massicott | H01S 3/1302 359/337 |
| 6,137,932 | A * | 10/2000 | Kim | H01S 3/1302 398/1 |
| 6,163,638 | A | 12/2000 | Eggleton et al. | |
| 6,330,383 | B1 | 12/2001 | Cai et al. | |
| 6,453,093 | B2 | 9/2002 | Xie et al. | |
| 6,990,270 | B2 | 1/2006 | Nicholson | |
| 7,414,780 | B2 | 8/2008 | Fermann et al. | |
| 7,949,215 | B2 * | 5/2011 | Nicholson | H01S 3/06708 372/6 |
| 10,038,297 | B2 | 7/2018 | Regelskis et al. | |
| 2003/0180000 | A1 | 9/2003 | Brennan, III | |
| 2004/0091000 | A1 * | 5/2004 | Kuksenkov | H01S 3/06791 372/3 |
| 2008/0025348 | A1 | 1/2008 | Kuksenkov et al. | |
| 2014/0321492 | A1 | 10/2014 | Lin | |
| 2016/0274298 | A1 | 9/2016 | Luo | |
| 2019/0305516 | A1 | 10/2019 | Wise et al. | |

FOREIGN PATENT DOCUMENTS

| | | |
|---|---|---|
| WO | 2016020188 | 2/2016 |
| WO | 2016100330 | 6/2016 |

OTHER PUBLICATIONS

Ultrafast Lasers Market—Growth, Trends, and Forecast (2020-2025), https://www.mordorintelligence.com/industry-reports/ultrafast-lasers-market. Retrived on Apr. 4, 2020.

Pavel Sidorenko, Walter Fu, Logan G. Wright, Michel Olivier, and Frank W. Wise, "Self-seeded, multi-megawatt, Mamyshev oscillator," Opt. Lett. 43, 2672-2675 (2018).

Where to Buy Mode-locked Fiber Lasers. https://www.rp-photonics.com/bg/buy_mode_locked_fiber_lasers.html?s=vbox. Retrived on Apr. 4, 2020.

Dionne et al. Pulse Stretching Using High Accuracy Chirped Fiber Bragg Grating. 2015. TeraXion.

Ilday, Fatih & Oktem, B. & Ulgudur, C. (2011). Nonlinearity engineering of mode-locked fiber lasers: Similariton and soliton-similariton lasers.

Rochette et al. Multiwavelength and Tunable Self-Pulsating Fiber Cavity Based on Regenerative SPM Spectral Broadening and Filtering. IEEE Photonics Technology Letters, vol. 20, No. 17, Sep. 1, 2008.

Analyzing and Designing Mode-locked Fiber Lasers. https://www.rp-photonics.com/mode_locked_fiber_lasers.html.

Michel Piche, "Mode locking through nonlinear frequency broadening and spectral filtering," Proc. SPIE 2041, Mode-locked and Other Ultrashort Laser Designs, Amplifiers, and Applications, (Jan. 5, 1994); doi: 10.1117/12.165631.

Olivier, Michel et al. "Femtosecond fiber Mamyshev oscillator at 1550 nm." Optics letters 44 4 (2019): 851-854.

Liu, Zhanwei et al. "Megawatt peak power from a Mamyshev oscillator." Optica 4 6 (2017): 649-654.

Luo, Xing et al. "All-Fiber Mode-Locked Laser Based on Mamyshev Mechanism With High-Energy Pulse Generation at 1550 nm." Journal of Lightwave Technology 38 (2020): 1468-1473.

Želudeviius, Julijanas et al. "Investigation of different configurations and operation regimes of fiber pulse generators based on nonlinear spectral re-shaping." Optics express 26 21 (2018): 27247-27264.

Hakima Morane. Laser Technology Market by Type(Carbon Dioxide Laser, Fiber Laser, and Solid State Laser), Revenue (Laser Revenue and System Revenue), Application (Laser Processing and Optical Communications), End User, Geography—Global Forecast to 2024. https://www.scitechnol.com/peer-review/laser-technology-market-by-type-carbon-dioxid. Retrived on Apr. 4, 2020.

Stéphane Pitois, Christophe Finot, Lionel Provost, D.J Richardson. Generation of localized pulses from incoherent wave in optical fiber lines made of concatenated Mamyshev regenerators. Journal of the Optical Society of America B, Optical Society of America, 2008, 25 (9), pp. 1537-1547. 10.1364/JOSAB.25.001537.hal-00406220.

Liu, Wu et al. "Femtosecond Mamyshev oscillator with 10-MW-level peak power." Optica (2019): n. p. 194-197.

Boulanger et al., All-fiber Mamyshev oscillator enabled by chirped fiber Bragg gratings, Jun. 12, 2020, vol. 45, No. 12 / Jun. 15, 2020 / Optics Letters.

Ma et al., Ultrabroadband, few-cycle pulses directly from a Mamyshev fiber oscillator, Dec. 20, 2019, vol. 8, No. I/ Jan. 2020 / Photonics Research.

Repgen et al., Amplification of ultrafast pulses in an extended Mamyshev regenerator, Feb. 21, 2020, Proc. SPIE 11260, Fiber Lasers XVII: Technology and Systems, 112600P.

* cited by examiner 500
508
506
502b
546b
509
586
512
510a
588
510b
546a
502a
518
546c
546'
516
511
502c

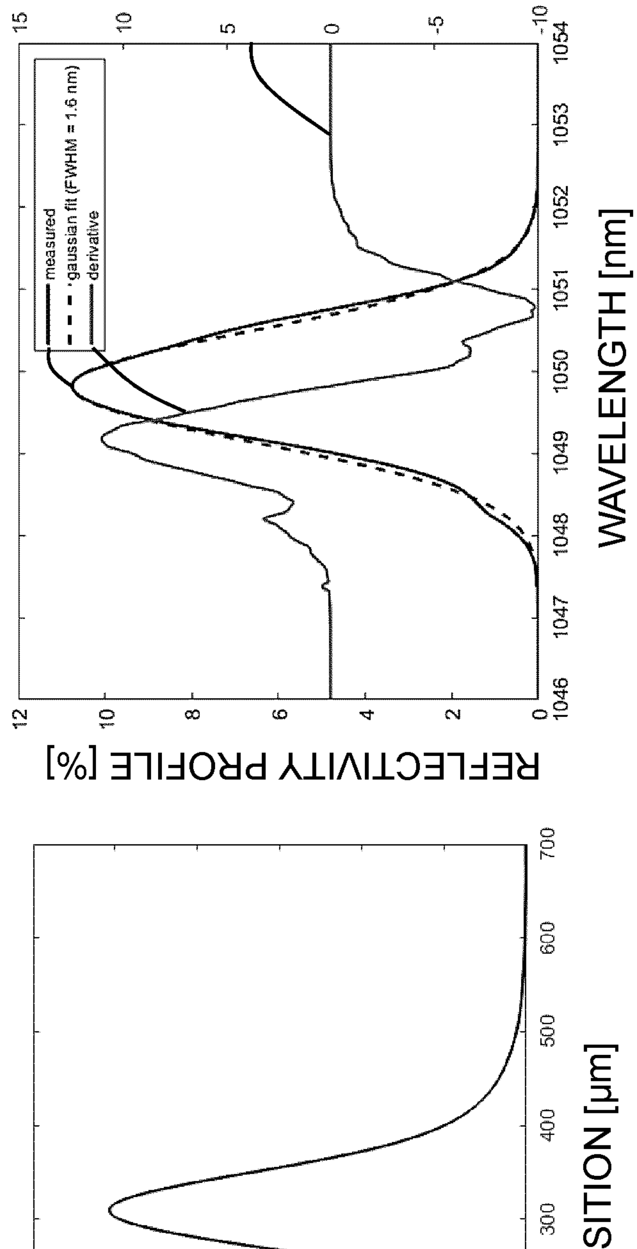
Fig. 13B
Fig. 13A

FIBER LASER SYSTEM

FIELD

The improvements generally relate to the field of fiber laser systems, and more particularly relate to optical pulse generation.

BACKGROUND

A fiber laser system generally has a laser-active optical fiber, a pump laser to pump the laser-active optical fiber, and a laser cavity supporting laser-modes when the laser-active optical fiber is pumped by the pump laser. When the laser-modes are locked to one another, the laser-modes are forced to constructively interfere with one another in a periodic manner, each time generating an optical pulse. Although existing fiber laser systems generating optical pulses are satisfactory to a certain degree, there always remains room for improvement, especially in limiting the number of free-space optical components, increasing the energy per optical pulse and/or generating shorter optical pulses.

SUMMARY

In an aspect, there is described a fiber laser system generally having a pump laser which generates a pump laser beam. The fiber laser system has a length of optical fiber which is optically coupled to the pump laser. The length of optical fiber has a laser cavity with an optical gain region, and two fiber Bragg gratings sandwiching the optical gain region. The two fiber Bragg gratings have reflectivity profiles which are detuned from one another. Accordingly, upon pumping of the optical gain region with the pump laser beam, and also upon mode locking of the laser cavity, only optical pulses that are amplified enough to experience spectral broadening as they propagate through the optical gain region are reflected back and forth within the laser cavity, between the two fiber Bragg gratings. For instance, noise that would be reflected by the reflectivity profile of the first fiber Bragg grating but not amplified enough to exhibit spectral broadening would not be reflected by the reflectivity profile of the second fiber Bragg grating, and vice versa. The fiber laser system has an output optically coupled to the laser cavity for outputting at least a portion of the optical pulses reflected within the laser cavity.

It was found that as conventional uniform fiber Bragg gratings have relatively narrow reflectivity profile bandwidths and relatively modest reflectivities, only a portion of each optical pulse can be effectively reflected within the laser cavity. Accordingly, it was found that by providing the first fiber Bragg grating with a first refractive index profile having a full width at half maximum bandwidth of at least 0.2 nm and a Gaussian-like apodization, optical pulses of a greater pulse energy and/or of a greater compressibility quality can be obtained. For instance, the Gaussian-like apodization can favor stability at greater pulse energies as this apodization can limit the presence of any side-lobes in the resulting reflectivity profile in turn increasing the desirability of the resulting optical pulses. In embodiments where the first refractive index profile has a varying grating period (i.e., a chirp), the first reflectivity profile can see its maximal reflectivity value increase, in addition to a broadening of its bandwidth, which can reflect a greater portion of the optical pulses present within the laser cavity.

In accordance with a first aspect of the present disclosure, there is provided a fiber laser system comprising: a pump laser generating a pump laser beam; and a length of optical fiber optically coupled to the pump laser, the length of optical fiber having: a laser cavity having a cavity path, a first fiber Bragg grating having a first reflectivity profile, a second filter having a second filter profile, and an optical gain region between the first fiber Bragg grating and the second filter along the cavity path, the first reflectivity profile being spectrally detuned from the second filter profile, the first fiber Bragg grating having a first refractive index profile comprising a full width at half maximum bandwidth of at least 0.2 nm and a Gaussian-like apodization, wherein, upon pumping of the optical gain region with the pump laser beam and mode locking of the laser cavity, optical pulses are circulated along the cavity path; and an output optically coupled to the laser cavity and outputting at least a portion of the optical pulses.

Further in accordance with the first aspect of the present disclosure, the first reflectivity profile of the first fiber Bragg grating can for example have a maximal reflectivity value of at least 40% and the full width at half maximum bandwidth is of at least 0.5 nm.

Still further in accordance with the first aspect of the present disclosure, the maximal reflectivity value of the first reflectivity profile can for example be at least 50%.

Still further in accordance with the first aspect of the present disclosure, the full width at half maximum bandwidth of the first reflectivity profile can for example be between about 4 nm and about 5 nm.

Still further in accordance with the first aspect of the present disclosure, the first refractive index profile can for example have a varying grating period, i.e., be chirped.

Still further in accordance with the first aspect of the present disclosure, the varying grating period of a respective one of the first and second refractive index profile can for example vary in a linear manner, thereby offering a linear group delay dispersion across the respective one of the first reflectivity profile and the second filter profile.

Still further in accordance with the first aspect of the present disclosure, the linear group delay dispersion can for example be steeper than $\pm 0.5\ ps^2$.

Still further in accordance with the first aspect of the present disclosure, the linear group delay dispersion of the varying grating period can for example be at least twice as steep as a linear group delay dispersion offered by the optical gain region.

Still further in accordance with the first aspect of the present disclosure, the second filter profile can for example have a maximal reflectivity or transmissivity value being smaller than a maximal reflectivity value of the first reflectivity profile, the output being optically coupled to the second filter.

Still further in accordance with the first aspect of the present disclosure, the second filter can for example be a second fiber Bragg grating, the second filter profile being a second reflectivity profile spectrally detuned from the first reflectivity profile.

Still further in accordance with the first aspect of the present disclosure, the first and second fiber Bragg gratings can for example sandwich at least a portion of the optical gain region along the cavity path, the cavity path thereby being a linear path along which the optical pulses are reflected in back-and-forth between the first and second fiber Bragg gratings.

Still further in accordance with the first aspect of the present disclosure, the second fiber Bragg grating can for example have a second refractive index profile having a full width at half maximum bandwidth of at least 0.2 nm and a Gaussian-like apodization.

Still further in accordance with the first aspect of the present disclosure, the second reflectivity profile of the second fiber Bragg grating can for example have a maximal reflectivity value of at least 40% and the full width at half maximum bandwidth is of at least 0.5 nm.

Still further in accordance with the first aspect of the present disclosure, the maximal reflectivity value of the second reflectivity profile can for example be at least 50%.

Still further in accordance with the first aspect of the present disclosure, the full width at half maximum bandwidth of the second reflectivity profile can for example be between about 4 nm and about 5 nm.

Still further in accordance with the first aspect of the present disclosure, the second refractive index profile can for example have a varying grating period.

Still further in accordance with the first aspect of the present disclosure, the fiber laser system can for example further comprise a mode locking device coupled to the length of optical fiber and contributing to said mode locking of said laser cavity.

Still further in accordance with the first aspect of the present disclosure, the mode locking device can for example have a stretching element longitudinally stretching at least one of the first fiber Bragg grating and the second filter, thereby modifying a spectral detuning between the first reflectivity profile and the second filter profile.

Still further in accordance with the first aspect of the present disclosure, the mode locking device can for example have an optical coupler optically coupled to the length of optical fiber and leading to a mode locking arm.

Still further in accordance with the first aspect of the present disclosure, the optical gain region can for example be a laser-active erbium-doped region, the pump laser beam having a wavelength of about 980 nm, the first reflectivity profile having a central wavelength of about 1550 nm, the second filter profile having a central wavelength of about 1565 nm.

Still further in accordance with the first aspect of the present disclosure, the pump laser can for example be a first pump laser, the fiber laser system further comprising a second pump laser optically coupled to the length of optical fiber and propagating a second pump laser beam along said optical gain region during said pumping.

Still further in accordance with the first aspect of the present disclosure, the output can for example be a main output optically coupled to the second filter, the fiber laser system comprising an auxiliary output optically coupled to the first fiber Bragg grating.

Still further in accordance with the first aspect of the present disclosure, the outputted optical pulses can for example have a similariton-like profile having a linearly varying instantaneous frequency and a pulse duration below 100 fs after compression.

Still further in accordance with the first aspect of the present disclosure, the optical pulses can for example have a pulse energy of at least 10 nJ.

In accordance with a second aspect of the present disclosure, there is provided a laser system comprising: a pump laser generating a pump laser beam; a laser cavity optically coupled to the pump laser, the laser cavity having a cavity path, a first filter having a first filter profile of a Gaussian-like shape, a second filter having a second filter profile, and an optical gain region between the first and second filters along the cavity path, the first and second filter profiles being spectrally detuned from one another, the first filter being dispersive thereby imparting a dispersive profile across at least at portion of the first filter profile, wherein, upon pumping of the optical gain region with the pump laser beam and mode locking of the laser cavity, optical pulses are circulated along the cavity path; and an output optically coupled to the laser cavity and outputting at least a portion of the optical pulses.

Further in accordance with the second aspect of the present disclosure, the first filter can for example be a fiber Bragg grating having an refractive index profile comprising a full width at half maximum bandwidth of at least 0.2 nm and a Gaussian-like apodization.

Still further in accordance with the second aspect of the present disclosure, the refractive index profile can for example have a varying grating period.

Still further in accordance with the second aspect of the present disclosure, at least a portion of the laser cavity can for example be fibered.

Many further features and combinations thereof concerning the present improvements will appear to those skilled in the art following a reading of the instant disclosure.

DESCRIPTION OF THE FIGURES

In the figures,

FIG. 10 is a graph showing another example of a second reflectivity profile of the second fiber Bragg grating of FIG. 1, also showing a group delay varying across at least a portion of the second reflectivity profile, in accordance with one or more embodiments;

FIG. 13A is a graph showing another example of a refractive index profile of a fiber Bragg grating operating at 1050 nm in an ytterbium-based laser cavity, in accordance with one or more embodiments; and FIG. 13B is a graph showing an example reflectivity profile of the fiber Bragg grating of FIG. 13A, in accordance with one or more embodiments.

DETAILED DESCRIPTION

Figure 1:
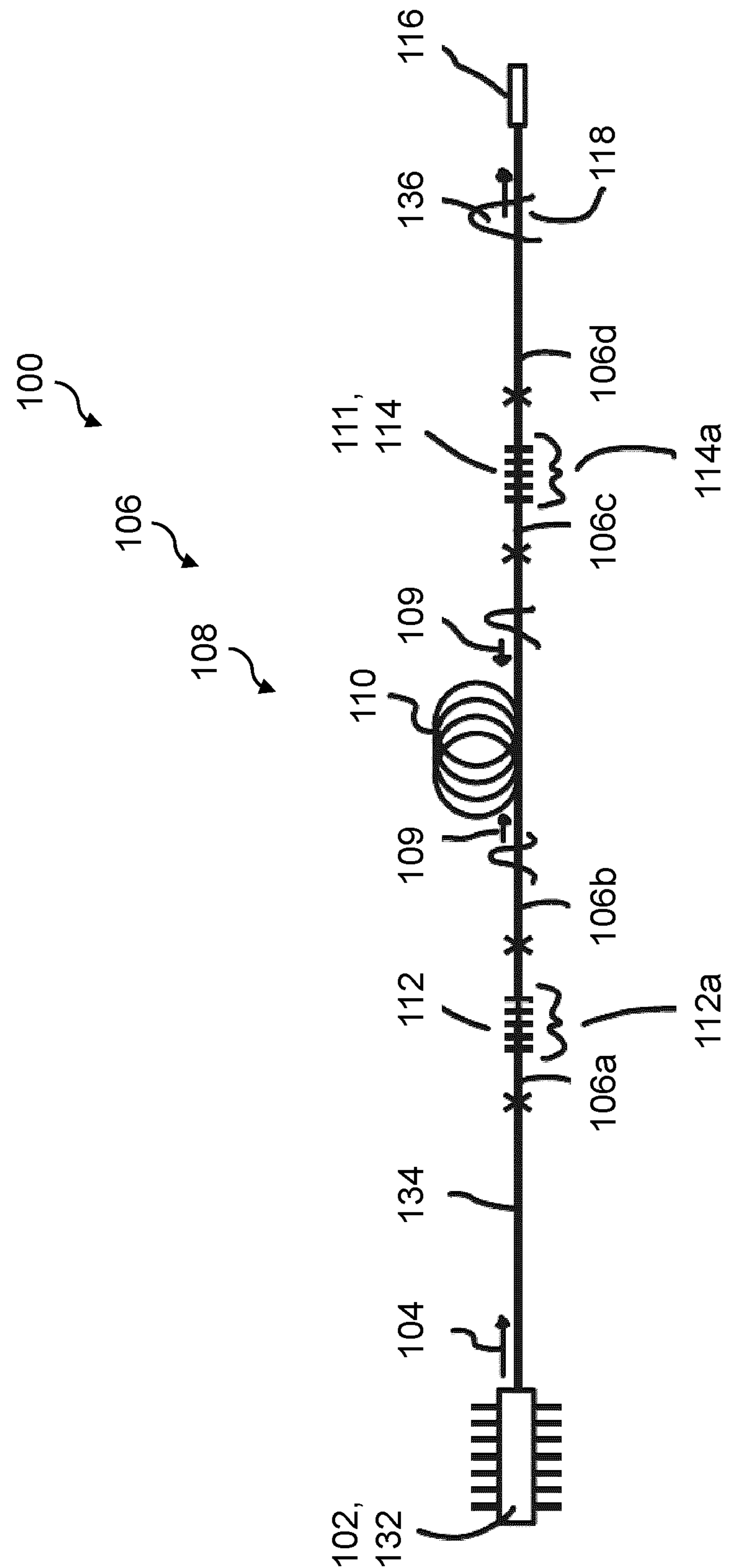
FIG. 1 is a schematic view of an example of a fiber laser system, with a pump laser, an optical gain region, and first and second fiber Bragg gratings sandwiching the optical gain region, in accordance with one or more embodiments.

FIG. 1 shows an example of a fiber laser system 100. As depicted, the fiber laser system 100 has a pump laser 102 generating a pump laser beam 104, and a length 106 of optical fiber which is optically coupled to the pump laser 102.

The length 106 of optical fiber has a laser cavity 108 having a cavity path 109, an optical gain region 110, a first fiber Bragg grating 112 along the cavity path 109, a second filter 111 spaced-apart from the first fiber Bragg grating 112 along the cavity path 109, in which the optical gain region 110 lies between the first fiber Bragg grating 112 and the second filter 111. The length 106 of optical fiber also has an output 116 which is optically coupled to the laser cavity 108 for outputting optical pulses 118 generated within the laser cavity 108.

In this specific embodiment, the second filter 111 is provided in the form of a second fiber Bragg grating 114. As shown, the first and second fiber Bragg gratings 112 and 114 sandwich the optical gain medium 110, in which case the cavity path 109 is a linear path along which the optical pulses 118 are reflected in back-and-forth between the first and second fiber Bragg gratings 112 and 114.

Each of the first and second fiber Bragg gratings 112 and 114 has a respective refractive index profile inscribed along respective portions 112*a* and 114*a* of the length 106 of optical fiber, thereby imparting a corresponding reflectivity profile to the first and second fiber Bragg gratings 112 and 114.

Figures 1A, 1B, 1C:
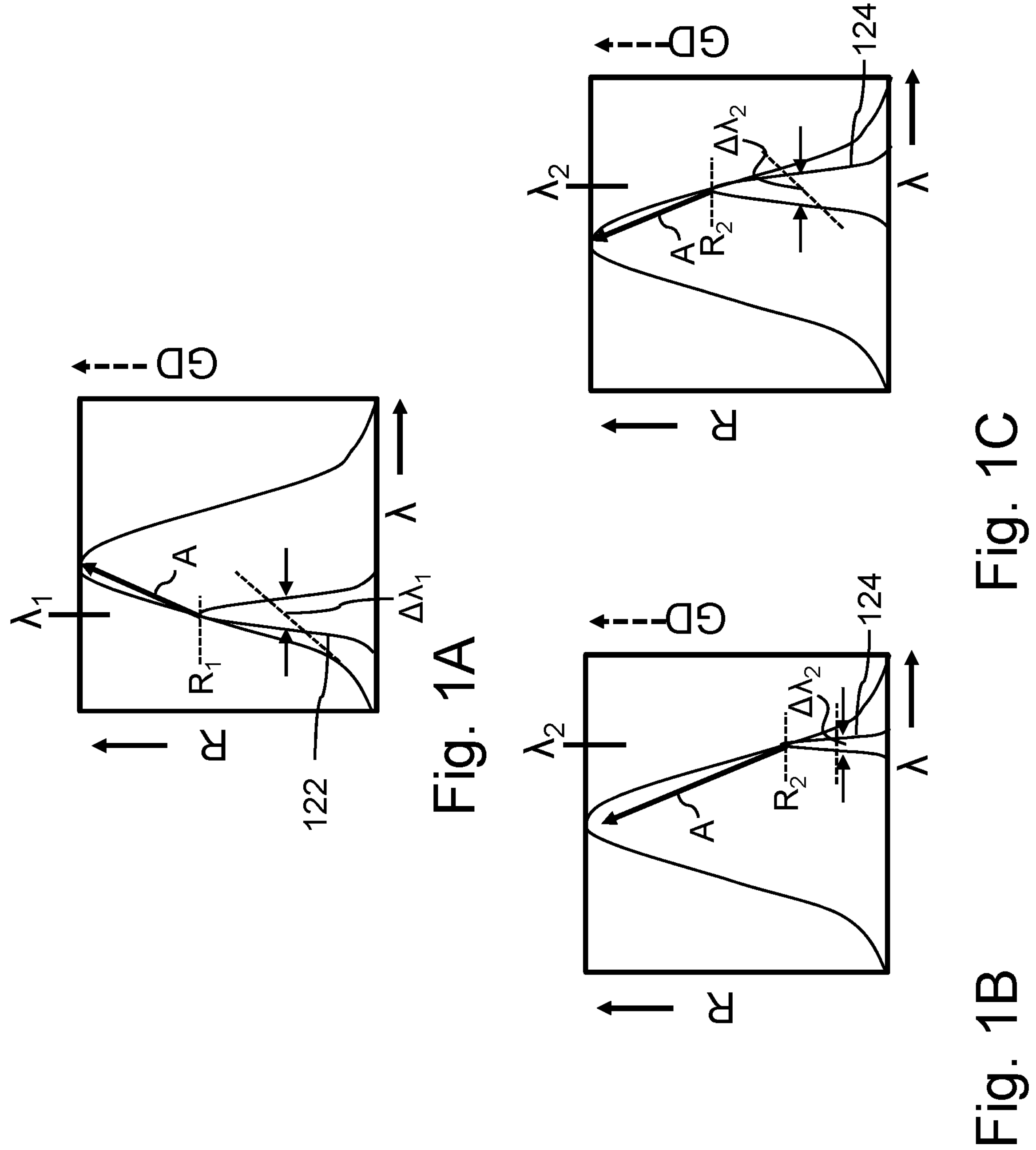
FIG. 1A is a graph showing an example of a first reflectivity profile of the first fiber Bragg grating of FIG. 1, also showing a group delay varying across at least a portion of the first reflectivity profile, in accordance with one or more embodiments.
FIG. 1B is a graph showing an example of a second reflectivity profile of the second fiber Bragg grating of FIG. 1, also showing a constant group delay, in accordance with one or more embodiments.

In this specific example, the first fiber Bragg grating 112 has a first reflectivity profile which is detuned from a second reflectivity profile of the second fiber Bragg grating. FIG. 1A shows an example of a first reflectivity profile 122 of the first fiber Bragg grating 112, which is in this case centered on a first Bragg wavelength λ1. FIGS. 1B and 1C show examples of a second reflectivity profile 124 of the second fiber Bragg grating, which are in this case centered on a second Bragg wavelength λ2 being spectrally spaced-apart from the first Bragg wavelength λ1 of the first reflectivity profile 122.

As can be appreciated, the spectral contents of an optical pulse reflected by the first reflectivity profile 122 of the first fiber Bragg grating 112 tend to be spectrally broadened (see arrow A) during its propagation in the laser cavity 108 to encompass the second Bragg wavelength λ2 of the second reflectivity profile 124 of the second fiber Bragg grating 114, and vice versa, thereby allowing optical pulses to be reflected in back-and-forth between the first and second fiber Bragg gratings 112 and 114 when the optical gain region 110 is pumped with the pump laser beam 104 and when the laser cavity 108 is mode locked. As such, only optical pulses that are amplified enough to experience spectral broadening as they propagate through the optical gain region 110 can oscillate within the laser cavity 108. Such architecture, based on the presence of two offset filters in a nonlinear laser cavity, can be referred to as a Mamyshev oscillator.

Figure 2:
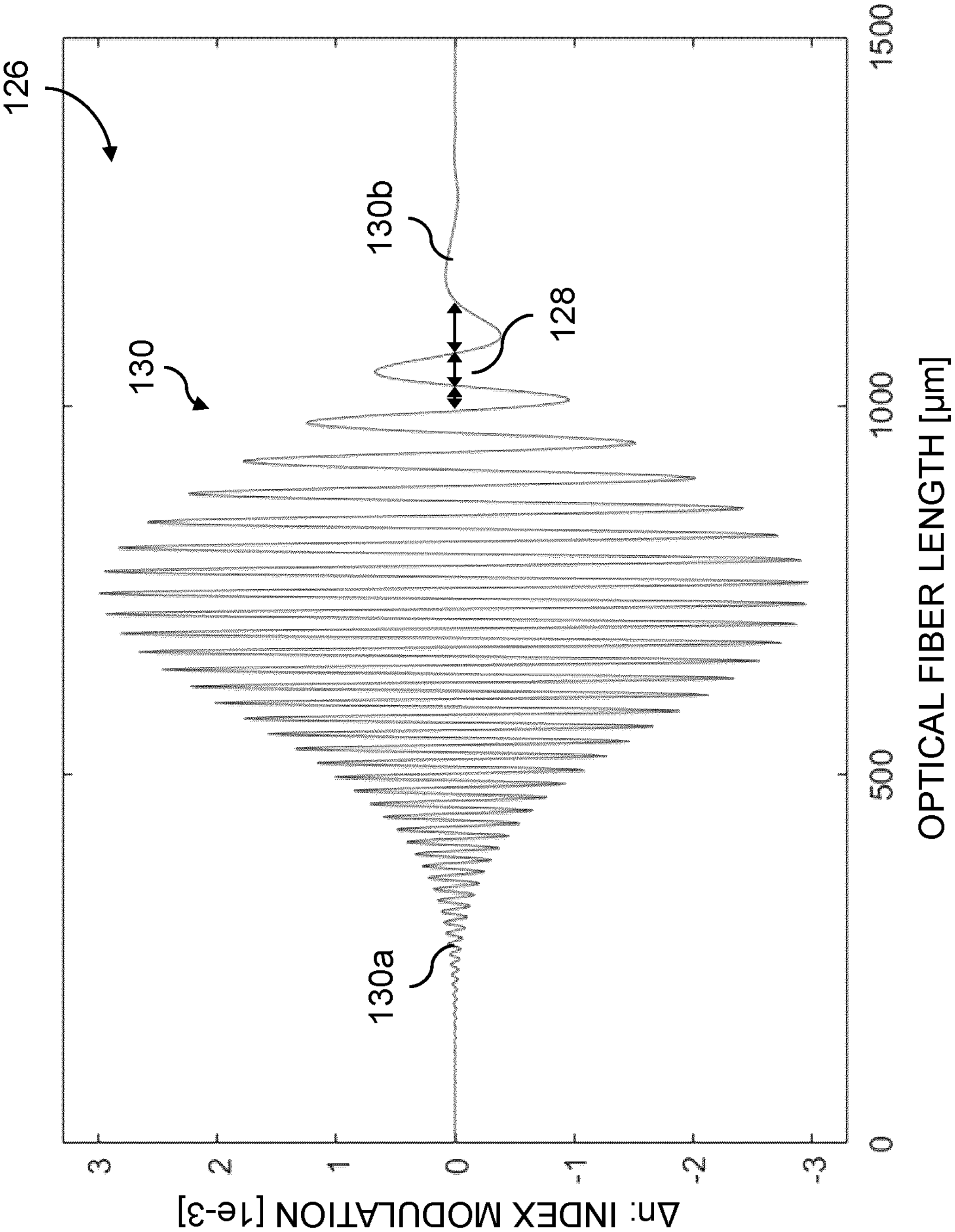
FIG. 2 is a graph showing an exemplary refractive index profile of the first fiber Bragg grating of FIG. 1, showing a chirp and a Gaussian-like apodization, in accordance with one or more embodiments.

In this example, the first fiber Bragg grating 112 has a first refractive index profile 126 comprising a varying grating period 128 (i.e., a chirp) and a Gaussian-like apodization 130, an example of which is shown in FIG. 2. As can be appreciated, the grating period 128 of the first refractive index profile varies along the portion of the length of optical fiber on which it is inscribed. The varying grating period creates a chirp, thereby enhancing a maximal reflectivity value of the first reflectivity profile and broadening its bandwidth. In this embodiment, the first fiber Bragg grating is thus a chirped fiber Bragg grating or "CFBG." The Gaussian-like apodization 130 shows that the refractive index n varies according to a Gaussian-like profile. The Gaussian-like profile favors stable optical pulses at greater pulse energy. The term apodization refers to the grading of the refractive index n which approaches zero at both ends 130*a* and 130*b* of the first refractive index profile 126. Apodized fiber Bragg gratings can be convenient in terms of side-lobe suppression while maintaining satisfactory reflectivity. The Gaussian-like apodization 130 can be described as encompassing any apodization which can achieve a smooth reflectivity profile within the main lobe such that the rate of variations in absolute is below about 1000%/nm and/or side-lobes reflectivity are below about −10 dB. In some embodiments, the Gaussian-like apodization 130 can have a shape that is slightly asymmetric which can yield a symmetric Gaussian reflectivity profile, for instance. It is noted that the first refractive index profile 126 shown in FIG. 2 is exemplary only, as the illustrated varying grating period is not a real value nor to scale. The varying grating period 128, or equivalently the chirp, is only optional in the first refractive index profile 126. Accordingly, the first refractive index profile 126 can have a non-varying or uniform grating period in some other embodiments.

The construction of the first fiber Bragg grating is such that the first refractive index profile 126 has a full width at half maximum bandwidth of at least 0.2 nm, which can provide greater pulse energy and/or greater compressibility quality. In some embodiments, the full width at half maximum bandwidth of the first refractive index profile 126 can advantageously be higher than 0.2 nm. Referring back to FIG. 1A, thanks to the first varying grating period and to the Gaussian-like apodization of the first refractive index profile, the first reflectivity profile 122 of the first fiber Bragg grating 112 can have a maximal reflectivity value R1 of at least 40% and a full width at half maximum bandwidth Δλ1 of at least 0.5 nm. In some embodiments, the maximal reflectivity value R1 of the first reflectivity profile 122 is at least 50%, preferably at least 55%, and most preferably at least 60%. In some embodiments, the full width at half maximum bandwidth Δλ1 of the first reflectivity profile 122 is at least about 0.2 nm, preferably at least about 2 nm or 3 nm and most preferably between about 4 nm and about 5 nm.

It is encompassed that the optical pulses 118 that are outputted at the output 116 can have a pulse energy of at least 10 nJ, preferably at least 15 nJ and most preferably at least 20 nJ, thanks to the maximal reflectivity value R1 and to the full width at half maximum Δλ1 of the first reflectivity profile 122 of the first fiber Bragg grating 122.

In some embodiments, the varying grating period of the first fiber Bragg grating 112 can vary in a linear manner across at least a portion of the first reflectivity profile 122, as in Fabry-Perot laser cavities. In these embodiments, the first fiber Bragg grating 112 can offer a linear group delay dispersion across at least a portion of the first reflectivity profile 122, such as shown by the dashed line of FIG. 1A. It is envisaged that the linear group delay dispersion can be steeper than ±0.5 $ps^2$, example of which will be described below. In some embodiments, the linear group delay dispersion of the varying grating period of the first fiber Bragg grating 112 is at least twice as steep as a linear group delay dispersion offered by the optical gain region 110. In some other embodiments, the varying grating period of the first fiber Bragg grating 112 can vary in a nonlinear manner as well. Regardless of how the grating period of the first fiber Bragg grating 112 varies, the first fiber Bragg grating 112 can be used to compensate dispersion occurring elsewhere within the laser cavity 108. For instance, the optical gain region 110 may have a normal dispersion, i.e., the optical group velocity increases with wavelength, which will cause an optical pulse propagating thereacross to see its longer wavelengths travel faster than its shorter wavelengths. Anomalous dispersion is just the opposite, meaning that the group velocity of the guided optical mode decreases with a gradually increasing wavelength. The cavity dispersion at each round-trip does not need to be strictly compensated. However, the group velocity dispersion of the first fiber Bragg grating 112 can be used to compensate the fiber dispersion and manipulate the filtered pulse phase, intensity, and spectrum profile. Thus, it is possible to optimize the following nonlinear amplification which can, for instance, improve the output pulse compressibility. The first fiber Bragg grating 112 can be used to impart this opposite-sign dispersion to an optical pulse. As such, the linear group delay dispersion can be anomalous in some embodiments, whereas the linear group delay dispersion can be normal in some other embodiments. When the opposite-sign is chosen, a higher absolute value of group delay dispersion can be used for the first fiber Bragg grating 112, meaning lower chirp for the index profile of the first fiber Bragg grating 112, and thus further improve the maximal reflectivity value R1 of the first reflectivity profile.

In some embodiments, the second fiber Bragg grating 114 has a second refractive index profile comprising a constant grating period (i.e., no chirp), thereby imparting a reflectivity profile such as the one shown at 124 in FIG. 1B. In such embodiment, the second reflectivity profile 124 of the second fiber Bragg grating 114 can have a reduced reflectivity value R2 and a reduced full width at half maximum bandwidth Δλ2. In some embodiments, the maximal reflectivity value R2 of the second reflectivity profile 124 is at least 10%, preferably at least 20%, and most preferably at least 30%. In some embodiments, the full width at half maximum bandwidth Δλ2 of the second reflectivity profile 124 is at least about 2 nm, preferably at least about 3 nm and most preferably between about 4 nm and about 5 nm. In embodiment where the second fiber Bragg grating 114 is not chirped, the second fiber Bragg grating 114 can offer a null group delay dispersion across at least a portion of the second reflectivity profile 124, such as shown by the dashed line of FIG. 1B. In any case, the full width at half maximum bandwidths of the first and second reflectivity profiles are similar to one another in some embodiments.

Although not mandatory, the second fiber Bragg grating 114 can be chirped in a similar way than the first fiber Bragg grating 112. For instance, the grating period of the second refractive index profile can also vary along the portion of the length of optical fiber on which it is inscribed. The varying grating period creates a chirp, thereby enhancing a maximal reflectivity value R2 of the second reflectivity profile 124 and broadening its bandwidth Δλ2, such as shown in the second reflectivity profile shown at 124 in FIG. 10. The Gaussian-like apodization of the second refractive index profile can favor stable optical pulses or greater pulse energy. In such embodiments, the second refractive index profile can have similarities with the first refractive index profile. The second reflectivity profile 124 can also have a full width at half maximum bandwidth of at least 0.2 nm in some embodiments.

Still referring to FIG. 10, the second reflectivity profile 124 of the second fiber Bragg grating 114 can have a maximal reflectivity value R2 of at least 40% and a full width at half maximum bandwidth Δλ2 of at least 0.5 nm due to the varying grating period and Gaussian-like apodization of the second optical fiber refractive index. In some embodiments, the maximal reflectivity value R2 of the second reflectivity profile 124 is at least 50%, preferably at least 55%, and most preferably at least 60%. In some embodiments, the full width at half maximum bandwidth Δλ2 of the second reflectivity profile 124 is at least about 0.2 nm, preferably at least about 2 nm or 3 nm, and most preferably between about 4 nm and about 5 nm.

In some embodiments, the varying grating period of the second fiber Bragg grating 114 can vary in a linear manner across at least a portion of the second reflectivity profile 124. In these embodiments, the second fiber Bragg grating 114 can offer a linear group delay dispersion across at least a portion of the second reflectivity profile 114, such as shown by the dashed line of FIG. 1C. It is envisaged that the linear group delay dispersion can be steeper than ±0.5 $ps^2$. In some embodiments, the linear group delay dispersion of the varying grating period of the second fiber Bragg grating 114 is at least twice as steep as a linear group delay dispersion offered by the optical gain region 110. In some other embodiments, the varying grating period of the second fiber Bragg grating 114 can vary in a nonlinear manner. The linear group delay dispersion can be negative in some embodiments, whereas the linear group delay dispersion can be positive in some other embodiments.

In some embodiments, the second filter 111 may not be a fiber Bragg grating. Regardless, the second filter 111 imparts a filter profile which is spectrally detuned from the first reflectivity profile 122 of the first fiber Bragg grating 112, thereby forming an oscillator of the Mamyshev type. Accordingly, the second filter 111 can be reflective or transmissive in which case the corresponding second filter profile can be a reflectivity profile or a transmissivity profile, respectively. Indeed, in these embodiments, the second filter 111 can be a dielectric filter, a tunable filter, a loop incorporating one or more filter units and one or more optical circulators, or any combination thereof. In some embodiments, however, providing the second filter 111 in the form of a fiber Bragg grating may be convenient as it may allege the complexity of the corresponding laser cavity.

As the example illustrated in FIG. 1, the length 106 of optical fiber comprises a first segment 106*a* of optical fiber having the first fiber Bragg grating 112, a second segment 106*b* having the optical gain region 110, a third segment 106*c* having the second fiber Bragg grating 114, and a fourth segment 106*d* having the output 116. In this specific example, the first, second, third and fourth segments are fusion spliced or otherwise optically connected to one another. For instance, optical connectors can be used to optically connect the segments to one another. Depending on the embodiment, the length 106 of optical fiber can have fewer than or more than 4 segments. For instance, the first and second fiber Bragg gratings 112 and 114 can be inscribed directly within the optical gain region 110 in some embodiments. It is noted that the length 106 of optical fiber can have optical fiber segments other than those for the first and second fiber Bragg gratings 112 and 114 and for the optical gain region 110. Indeed, it is envisaged that the length 106 of optical fiber can include any suitable number of optical fiber segments comprising either passive or active optical fiber. In some embodiments, additional passive optical fiber segments are used within the laser cavity 108 to control parameters such as the dispersion, the nonlinearity and the repetition rate of the resulting fiber laser system.

Also shown in this embodiment, the pump laser 102 is provided in the form of a fibered laser diode 132 which fibered output 134 is optically connected to the first segment 106*a* of the length 106 of optical fiber. More specifically, the fibered output 134 of the fibered laser diode 132 is fusion spliced or otherwise optically connected to the first end 106*a* of the length 106 of optical fiber in this specific embodiment. In some other embodiments, the pump laser 102 can be provided in any suitable type of laser including, but not limited to, a fiber laser emitting a pump laser beam, and the like.

As can be appreciated, in this example, the second reflectivity profile 114 has a maximal reflectivity value R2 which is smaller than a maximal reflectivity value R1 of the first reflectivity profile 112, in this case the output 116 is optically coupled to the second fiber Bragg grating 114 which transmits a greater portion of the optical pulses 118 oscillating within the laser cavity 108 than the first fiber Bragg grating 112 would. In some embodiments, the outputted optical pulses 118 have a similariton-like profile 136 having a linearly varying instantaneous frequency thereby allowing a pulse duration below 100 fs or below after compression.

The optical gain region 110 can be any type of optical fiber being laser-active via doping with one or more rare-earth ions such as erbium ions ($Er^{3+}$), ytterbium ions ($Yb^{3+}$), thulium ions ($Tm^{3+}$), holmium ions ($Ho^{3+}$), dysprosium ions ($Dy^{3+}$), praseodymium ions ($Pr^{3+}$), neodymium ions ($Nd^{3+}$) or any combination thereof. The concentration of rare-earth ions can vary from a laser-active doped region to another. The laser-active doped region can have a conventional silica-based matrix embedding the rare-earth ions. Otherwise, the matrix of the optical fiber can be a low phonon energy glass such as fluoride-, chalcogenide-, chalcohalide- or telluride-based glass to name a few examples. For instance, in some embodiments, the low phonon energy glass is a zirconium fluoride glass having a composition including $ZrF_4$ such as ZBLAN ($ZrF_4/HfF_4$, $BaF_2$, $LaF_3$, NaF, and $AlF_3$). In some other embodiments, the low phonon energy glass is an indium fluoride glass having a composition including $InF_3$. In alternate embodiments, the low phonon energy glass is an aluminum fluoride glass having a composition including $AlF_3$. In further embodiments, the low phonon energy glass is a chalcogenide glass having a composition including $As_2S_3$, $As_2Se_3$, AsTe, AsSSe, AsSTe, GaLaS, GeAsS, GeAsSe or the like. Photonic crystal fibers, large mode area (LMA) fiber, and other type of specialty optical fiber may be used in the fiber laser system. Moreover, it is noted that the optical gain region 110 can provide optical gain via nonlinear effects such as stimulated Raman scattering or any other suitable nonlinear effect or combination thereof. In embodiments where the optical gain region 110 relies on such nonlinear effects, the optical gain region 110 needs not to be doped with rare-earth ions, for instance.

For instance, in embodiments where the optical gain region 110 is erbium-doped with a silica-based matrix, the pump laser beam 104 can have a wavelength of about 980 nm. The length of the optical gain region 110 can be at least 5 m, preferably at least 8 m, and most preferably at least 10 m. For instance, in this specific embodiment, the optical gain region 110 is 10.8-m long. In these embodiments, the first reflectivity profile 122 can have a first Bragg wavelength λ1 of about 1550 nm whereas the second reflectivity profile 124 can have a Bragg wavelength $\lambda 2$ of about 1565 nm, thereby leaving a spectral detuning of about 15 nm. In some embodiments, the spectral detuning can be less than about 15 nm whereas in some other embodiments, the spectral detuning can be more than about 15 nm.

In this specific embodiment, the first fiber Bragg grating 112 is chirped, with a first reflectivity profile having a maximal reflectivity R1 of about 65% and a full width at half maximum $\Delta\lambda 1$ of about 4.7 nm. The second fiber Bragg grating 114 is chirped, too, with a second reflectivity profile having a maximal reflectivity R2 of about 41% and a full width at half maximum $\Delta\lambda 2$ of about 4.5 nm. The length 106 of optical fiber is entirely made of polarization-maintaining (PM) fiber in this embodiment, which can contribute to the stability of the optical pulse generation. However, in some other embodiments, only a portion of the length 106 of optical fiber can be PM.

As will be understood from the example below, the fiber laser system described herein can have one or more mode locking devices, one or more pump lasers, one or more outputs, one or more optical couplers, one or more polarization isolators, pump reflectors and the like.

Figures 3, 3A:
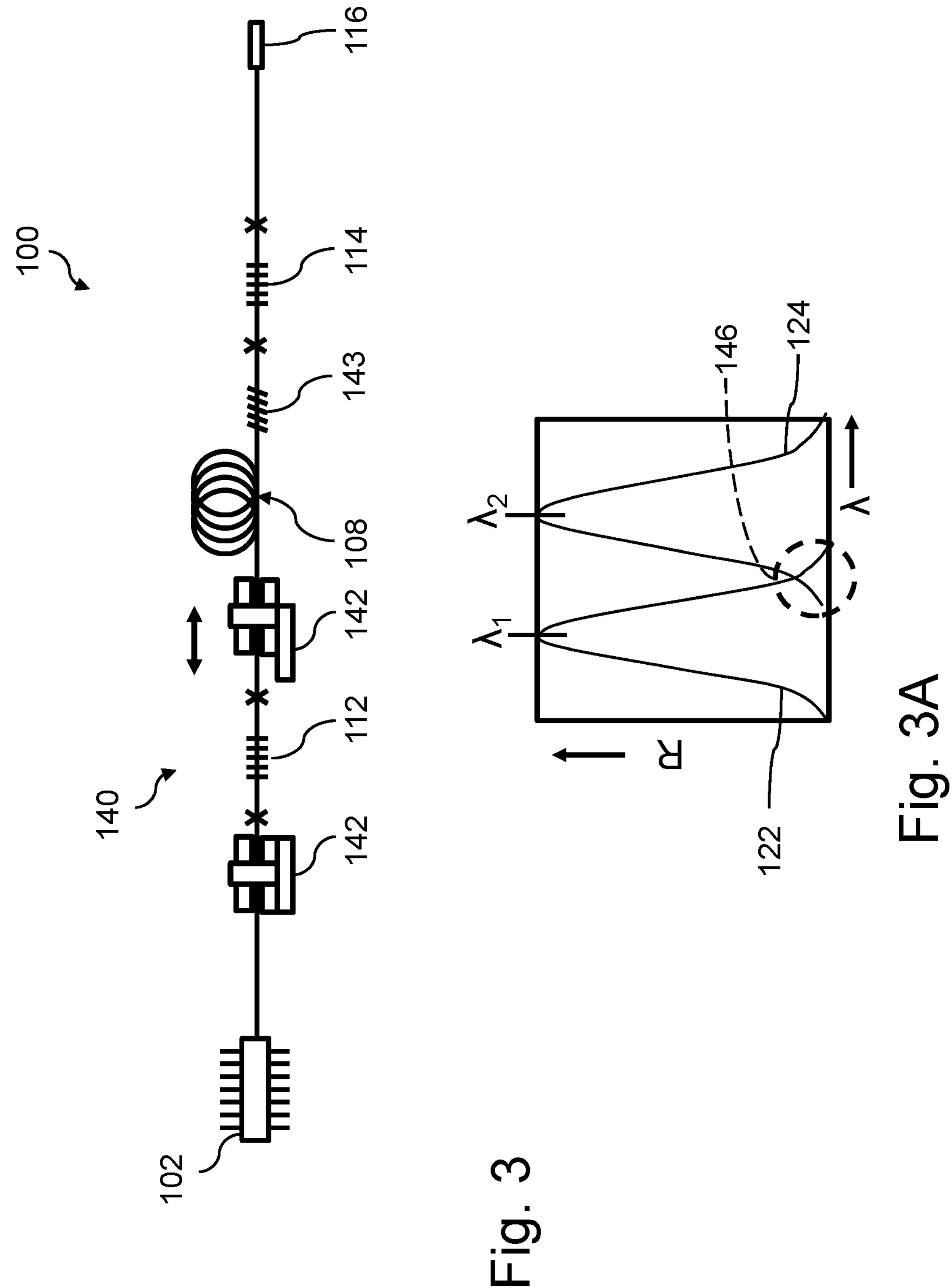
FIG. 3 is a schematic view of the fiber laser system of FIG. 1, shown with a mode locking device comprising a stretching element stretching the second fiber Bragg grating, in accordance with one or more embodiments.
FIG. 3A is a graph showing reflectivity profiles of the first and second fiber Bragg gratings of the fiber laser system of FIG. 1, in accordance with one or more embodiments.

For instance, FIG. 3 shows the fiber laser system 100 with an example mode locking device 140 which is coupled to the length 106 of optical fiber and which contributes to the mode locking of the laser cavity 108. As shown in this example, the mode locking device 140 has two spaced-apart stretching elements 142 longitudinally stretching the first fiber Bragg grating 112, thereby modifying a spectral detuning between the first and second reflectivity profiles 122 and 124, which can facilitate the mode locking. FIG. 3A shows how the first and second reflectivity profiles 122 and 124 can be brought together or pushed away from one another using the stretching elements 142. In some circumstances, to mode lock the laser cavity 108, the stretching elements 142 are operated so that adjacent tails 146 of the first and second reflectivity profiles 122 and 124 overlap with one another by a given amount. Alternatively or additionally, a similar mode locking device can be used to stretch the second fiber Bragg grating 114. In any case, stretching a fiber Bragg grating has a tendency to redshift the Bragg wavelength of the corresponding reflectivity profile. Accordingly, if the first and second reflectivity profiles are to be brought towards one another, the stretching elements should be preferably installed on the fiber Bragg grating having the lower Bragg wavelength. In this case, the first fiber Bragg grating 112 has a first Bragg wavelength $\lambda 1$ which is lower than a second wavelength $\lambda 2$ of the second fiber Bragg grating 114, and accordingly the stretching elements 142 stretch the first fiber Bragg grating 112. In some other embodiments, the second wavelength $\lambda 2$ of the second fiber Bragg grating 114 is lower than the first Bragg wavelength $\lambda 1$ of the first fiber Bragg grating 112 and thereby the stretching elements 142 are installed on the second fiber Bragg grating 114 instead of on the first fiber Bragg grating 112. In some embodiments, the fiber laser system 100 has a tilted fiber Bragg grating 143 in the cavity path within the laser cavity 108. The tilted fiber Bragg grating 143 can provide a polarizing effect and/or additional filtering within the laser cavity 108, if necessary.

Figure 4:
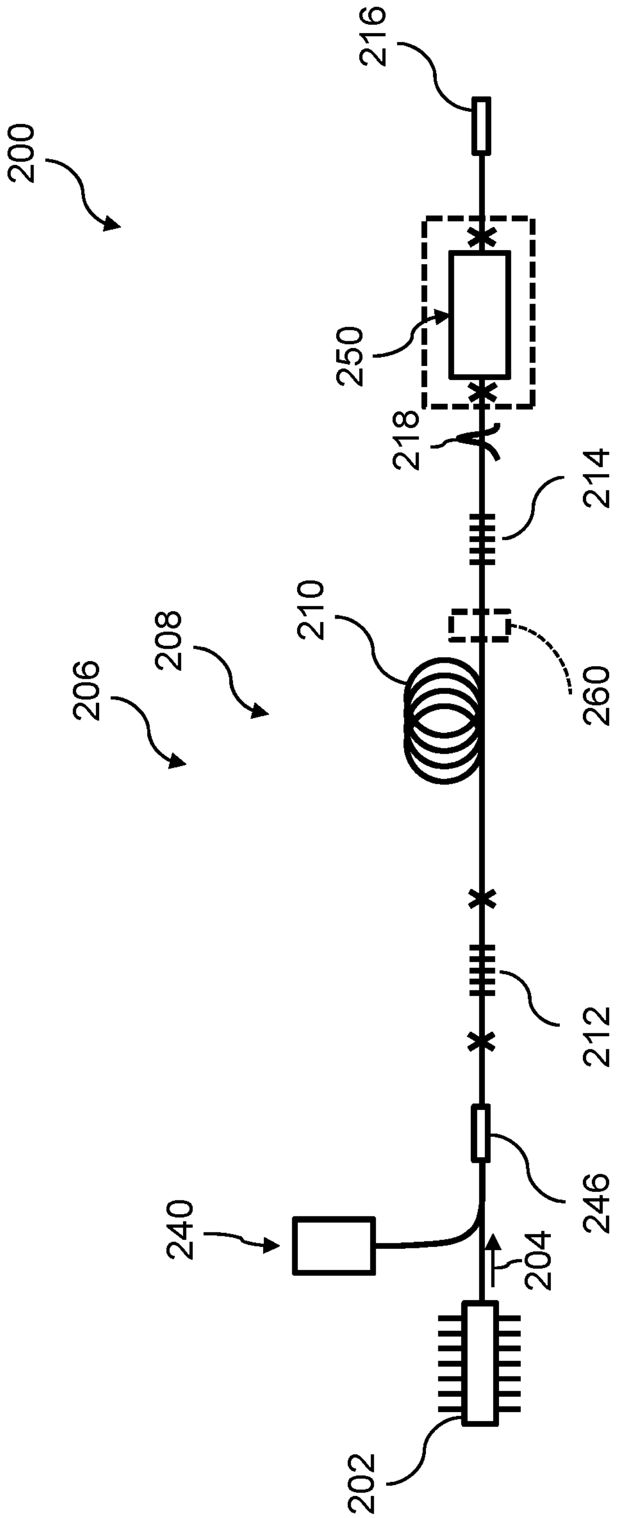
FIG. 4 is a schematic view of another example of a fiber laser system, with a pump laser, an optical gain region, first and second fiber Bragg gratings sandwiching the optical gain region, a mode locking arm and a pump reflector, in accordance with one or more embodiments.
Figures 4A, 4B:
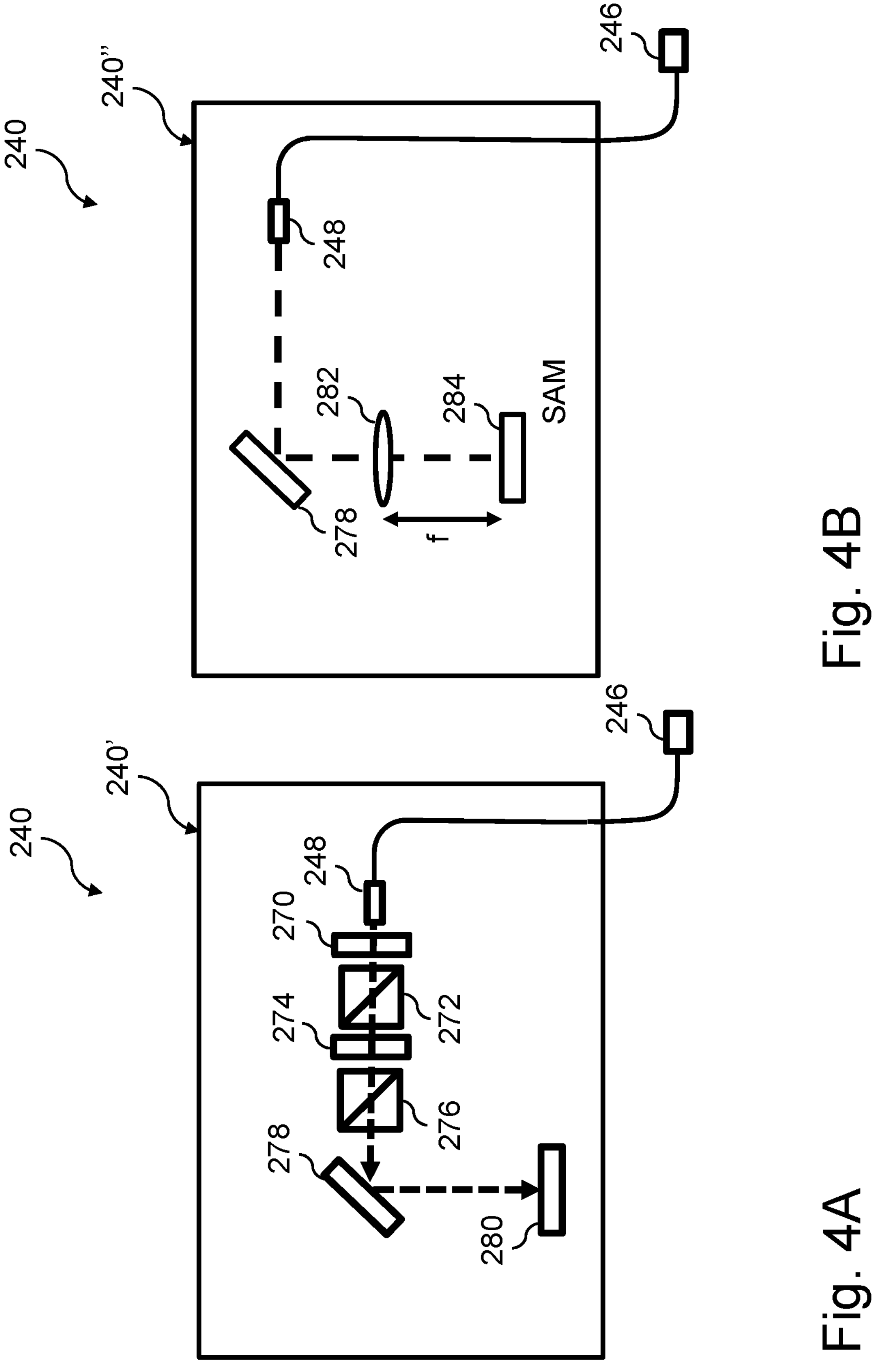
FIG. 4A is a schematic view of a first example of the mode locking arm of FIG. 4, in accordance with one or more embodiments.
FIG. 4B is a schematic view of a second example of the mode locking arm of FIG. 4, in accordance with one or more embodiments.

FIG. 4 shows another example of a fiber laser system 200. As shown, the fiber laser system 200 has a pump 202, a length 206 of optical fiber which is optically coupled to the pump 202. The length 206 of optical fiber has a laser cavity 208 with an optical gain region 210 and first and second Bragg gratings 212 and 214 such as the ones described above, and an output 216 optically coupled to the length 206 of optical fiber. As shown in this specific example, the fiber laser system 200 has a mode locking device 240 with an optical coupler 246 tapped on the length 206 of optical fiber, upstream from the laser cavity 208, and leading to a mode locking arm. FIGS. 4A and 4B show two different examples of such a mode locking devices 240. As can be appreciated, the mode locking devices 240 of FIGS. 4A and 4B help mode locking the laser cavity 208. In these embodiments, the fiber laser system 200 can have an auxiliary output 248 within the mode locking device.

The mode locking arm 240' of FIG. 4A has a first half wave plate 270, a first polarization beam splitter 272, a second half wave plate 274, a second polarization beam splitter 276, a flip mirror 278 movable between an in-path position and an out-of-path position, and a static mirror 280. These components are arranged in series with one another. When the flip mirror 278 is moved in the in-path position, an optical signal outputted from the auxiliary output 248 will be propagated across the first half wave plate 270, the first polarization beam splitter 272, the second half wave plate 274, the second polarization beam splitter 276, and then back into the laser cavity via the auxiliary output 248, thereby providing mode locking feedback to the laser cavity. Once the flip mirror 278 is moved back to the out-of-path position, the laser cavity can transition toward a stable single pulse mode locked regime.

FIG. 4B shows another example of a mode locking arm 240". As depicted, the mode locking arm 240" has a flip mirror 278, a lens 282, and a saturable absorber mirror 284. When the flip mirror 278 is moved in the in-path position, an optical signal outputted from the auxiliary output 248 will be propagated across the lens 282 towards the saturable absorber mirror 284, and then back into the laser cavity via the auxiliary output 248, thereby providing mode locking feedback to the laser cavity. In a similar manner, once the flip mirror 278 is moved back to the out-of-path position, the laser cavity can transition toward a stable single pulse mode locked regime.

The mode locking devices 140 and 240 described above with reference to FIGS. 3 and 4 are exemplary only. For instance, other mode locking devices can be used. In some embodiments, the mode locking device is a pump laser modulation device which modulates the pump laser 102 in accordance with predetermined modulation parameters, thereby providing mode locking feedback to the laser cavity 108 once steady state is achieved. Any other passive or active mode locking device can be used, as see fit by the skilled reader. The mode locking devices 140 and 240 described above with reference to FIGS. 3 and 4 can also be omitted, as the fiber laser cavity may mode lock on its own depending on the circumstances.

Referring back to FIG. 4, the first and second fiber Bragg gratings 212 and 214 sandwich only a portion of the optical gain region 210. For instance, the second fiber Bragg grating 214 is inscribed on a portion of the optical gain region 210 of the length 206 of optical fiber. Accordingly, the optical gain region 210 extends beyond the second fiber Bragg grating 214 towards the output 216 in this specific embodiment. As such, the length 206 of optical fiber can lack the optical losses generally associated with the optical connections between the laser cavity 208 and the output 216. In addition, partial amplification of the optical pulses 218 can occur even outside the laser cavity 208 with this architecture.

Also shown in this embodiment, the pump laser beam 204 is propagating across the optical gain region 210 and towards the output 216, and then reflected back towards the optical gain region 210 using a pump reflector 250 downstream from the second fiber Bragg grating 214. As such, the pump reflector can reflect any remaining portion of the pump laser beam 204 back towards the optical gain region 210 for further pumping. The pump reflector 250 can be a fiber Bragg grating, for instance. The pump reflector 250 is only optional, as it can be omitted in some embodiments.

In the above-described embodiments, the fiber laser system 200 is made of single-clad fiber having a core surrounded by at least a cladding, in which case the first and second fiber Bragg gratings are inscribed within a core of the single-clad fiber. However, in some other embodiments, another exemplary fiber laser system can be made of multi-clad fiber having a core surrounded by an inner cladding which is in turn surrounded by at least an outer cladding. In these latter embodiments, as the first and second fibre Bragg gratings may be inscribed in the core of the multi-clad fiber, any pump reflector such as pump reflector 250 may be a fiber Bragg grating inscribed instead in the inner cladding of the multi-clad fiber.

In some embodiments, it may be envisaged to provide the laser cavity 208 with a fibered polarizer 260 between the first and second fiber Bragg gratings 212 and 214 to fix the polarization state of the optical pulses 218 as desired. In such embodiments, it may also be preferable to position the fibered polarizer 260 immediately downstream from the second fiber Bragg grating 214.

Figure 5:
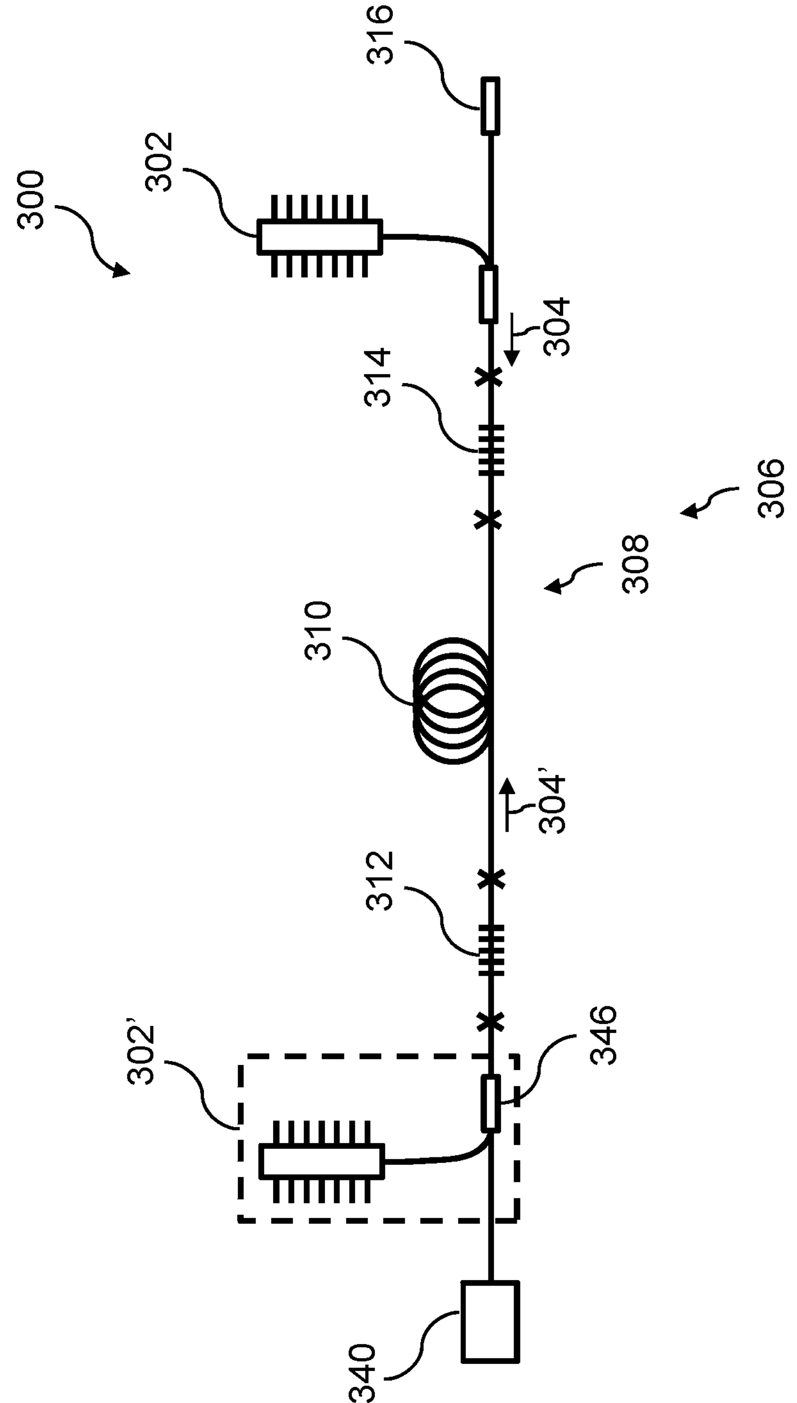
FIG. 5 is a schematic view of another example of a fiber laser system, with two pump lasers, an optical gain region, first and second fiber Bragg gratings sandwiching the optical gain region, and a mode locking arm, in accordance with one or more embodiments.

FIG. 5 shows another example of a fiber laser system 300. As shown, the fiber laser system 300 has a pump 302, a length 306 of optical fiber optically coupled to the pump 302. The length 306 of optical fiber has a laser cavity 308 with an optical gain region 310 and first and second Bragg gratings 312 and 314 such as the ones described above, and an output 316 optically coupled to the length 306 of optical fiber. In contrast with the fiber laser system 300 of FIG. 4, in this example, the pump laser 302 is downstream from the laser cavity 308, and propagates the pump laser beam 304 away from the output 316 and towards the laser cavity 308. In some embodiments, the fiber laser system 300 can have a second pump laser 302' upstream from the laser cavity 308 and which is optically coupled to the length 306 of optical fiber via an optical coupler. In this embodiment, the second pump laser 302' propagates a second pump laser beam 304' along the optical gain region 310 for increased pumping results. In such embodiments, the fiber laser system 300 may be provided with one or more optical isolators within or outside the laser cavity 308 to protect the pump lasers 302 and 302'. This is particularly convenient when the pump laser beams 304 and 304' have different wavelengths.

Although the fiber laser systems 100, 200 and 300 described above all have a linear cavity path along which the optical pulses are reflected in back-and-forth between the first and second fiber Bragg gratings, other embodiments of the fiber laser system described herein can have a ring-type cavity around which the optical pulses are circulated, examples of which are described with reference to FIGS. 6 and 7.

Figure 6:
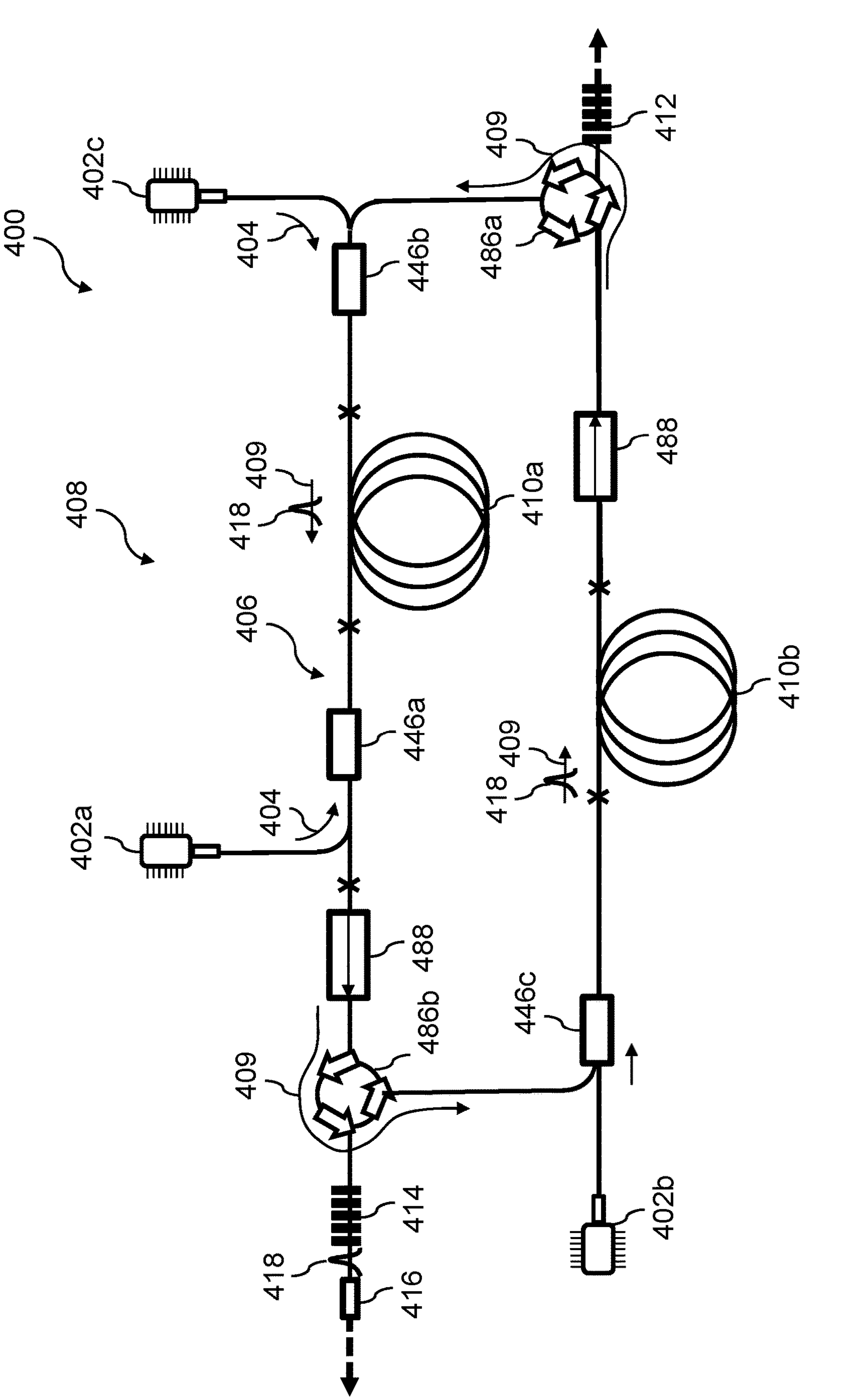
FIG. 6 is a schematic view of an example of a fiber laser system with a ring-type laser cavity incorporating first and second fiber Bragg gratings, in accordance with one or more embodiments.

FIG. 6 shows an example of a fiber laser system 400 in accordance with a ring-type Mamyshev oscillator architecture. As depicted, the fiber laser system 400 has a first pump laser 402*a* and a length 406 of optical fiber which is optically coupled to the first pump laser 402*a* via a first wavelength division multiplexing (WDM) coupler 446*a*. The length 406 of optical fiber has a laser cavity 408 with at least a ring cavity path 409, a first fiber Bragg grating 412 along the circular cavity path 409, a second fiber Bragg grating 414 along the circular cavity path 409 spaced apart from the first fiber Bragg grating 412, and a first optical gain region 410*a* between the first and second fiber Bragg gratings 412 and 414. An output 416 is optically coupled to the ring-type laser cavity 408 for outputting optical pulses 418.

As illustrated, optical circulators 486*a* and 486*b* are used to circulate optical pulses 418 reflected by the respective first and second fiber Bragg gratings 412 and 414 back on a different optical fiber segment, thereby allowing the optical pulses 418 to travel around the ring cavity path 409 in a counter-clock wise manner. Optical isolators 488 may be provided to block optical pulses propagating in the opposite direction. In this specific embodiment, a second optical gain region 410*b* is provided along the length 406 of optical fiber, between the first and second fiber Bragg gratings 412 and 414. To pump the first and second optical gain regions 410*a* and 410*b*, two additional pump lasers 402*b* and 402*c* are optically coupled to the laser cavity 408 using respective WDM couplers 446*b* and 446*c*. As shown, the first optical gain region 410*a* is pumped with two contra-propagating pump laser beams 404.

In accordance with the Mamyshev architecture, the first and second fiber Bragg gratings 412 and 414 have reflectivity profiles which are spectrally detuned with respect to one another. In this specific embodiment, the first and second fiber Bragg gratings 412 and 414 have refractive index profiles each having a varying grating period and a Gaussian-like apodization, thereby imparting reflectivity profiles of satisfactory reflectivity in terms of maximal reflectivity value and of full width at half maximum bandwidths. However, as mentioned above, the second fiber Bragg grating 414 is only optional, as any other filter of satisfactory filter profile may be used.

Figure 7:
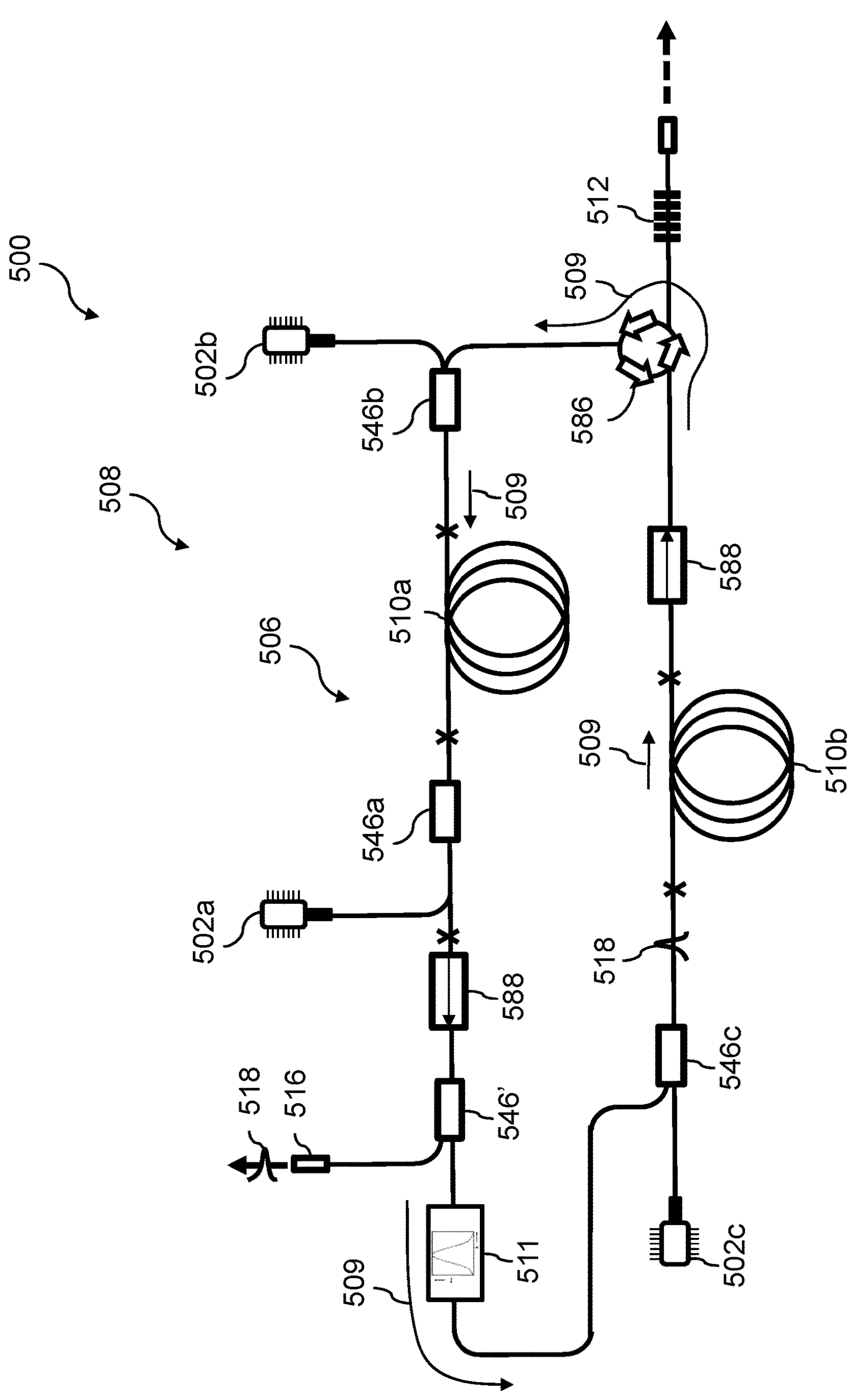
FIG. 7 is a schematic view of another example of a fiber laser system with a ring-type laser cavity incorporating a first fiber Bragg grating and a second dielectric transmissive filter, in accordance with one or more embodiments.

FIG. 7 shows another example of a fiber laser system 500 in accordance with a ring-type Mamyshev oscillator architecture. As depicted, the fiber laser system 500 has a first pump laser 502*a* and a length 506 of optical fiber which is optically coupled to the first pump laser 502*a* via a first WDM coupler 546*a*. The length 506 of optical fiber has a laser cavity 508 with at least a ring cavity path 509, a first fiber Bragg grating 512 along the circular cavity path 509, a second filter 511 along the circular cavity path 509 spaced apart from the first fiber Bragg grating 512, and a first optical gain region 510*a* between the first fiber Bragg grating 512 and the second filter 511. An output 516 is optically coupled to the ring-type laser cavity 508 via a 90/10 optical coupler 546', where optical pulses 518 are outputted. In this embodiment, the first fiber Bragg grating 512 has a refractive index profile with varying grating period and Gaussian-like apodization, thereby imparting the sought-after reflectivity profile described herein.

As illustrated, an optical circulator 586 is used to circulate optical pulses 518 reflected by the respective first fiber Bragg grating 512 back on a different optical fiber segment, thereby allowing the optical pulses 518 to travel around the ring cavity path 509 in a counter-clock wise manner. In contrast, as the second filter 511 is transmissive, no optical circulator is necessary to maintain the circulation of the optical pulses 518 along the ring cavity path 509.

Also shown in this example, the fiber laser system 500 has a second pump laser 502*b* which is optically coupled to the laser cavity 508 via a second WDM coupler 546*b*. The laser cavity 508 shown in this example also has a second optical gain region 510*b* being pumpable at least by a third pump laser 502*c* which is optically coupled thereto via a third WDM coupler 546*c*. Optical isolators 588 may be provided to block optical pulses propagating in the opposite direction.

It is noted that the fiber laser system 500 differs from the fiber laser system 400 of FIG. 6 in that the second filter 511 is not a fiber Bragg grating offering a reflectivity profile but instead a dielectric filter offering a transmissivity profile. As can be expected from a Mamyshev architecture, the first reflectivity profile of the first fiber Bragg grating 512 is spectrally detuned from a filter profile of the second filter 511, thereby enabling only optical pulses experiencing spectral broadening to subsist within the laser cavity 508, as in any Mamyshev oscillator. Other examples of the second filter can be used in some other embodiments.

Example 1—All-Fiber Mamyshev Oscillator Enabled by Chirped Fiber Bragg Gratings

Ultrafast fiber lasers thrive with the promise of offering more efficiency, compactness, robustness and simplicity than well-established bulky solid-state mode locked lasers. In the past, for high peak power applications, fiber laser oscillators may have struggled to manage nonlinearity in their tightly confined waveguide medium and could have been more competitive. Recently, a fiber laser system based on a new nonlinear saturable absorber (SA), called the Mamyshev oscillator (MO), was found to be interesting compared to existing lasers in various wavelength regions. It can now offer megawatt peak power levels while benefiting from the robustness of PM fibers. The fiber laser system can rely on self-phase modulation and two detuned spectral filters to support mode locking. Until now, high energy fiber laser system used paired collimators and diffraction gratings to achieve Gaussian filtering. However, these promising performances could benefit from implementation into a cost-effective all-fiber format with a reliable self-starting process to initiate a widespread deployment of their use outside specialized laboratories. The challenge is to obtain efficient and preferably tunable filters in an all-fiber format that are reliable at high power.

In this example, there is proposed a linear-cavity MO based on two chirped fiber Bragg gratings (CFBG) with Gaussian apodization as spectral filters. The chirp is preferable in the two FBGs to achieve high reflectivity for the required bandwidth. Moreover, it allows us to manage the nonlinearity in the Mamyshev oscillator by using highly dispersive filters. Here, there is presented an experimental MO-based fiber laser system that generates pulses with an energy of 21.3 nJ and a duration of 108 fs after compression. The results are in agreement with numerical simulations that allow us to propose guidelines for the CFBG-based design and to study the impact of filter dispersion on the nonlinear pulse evolution.

Figure 8:
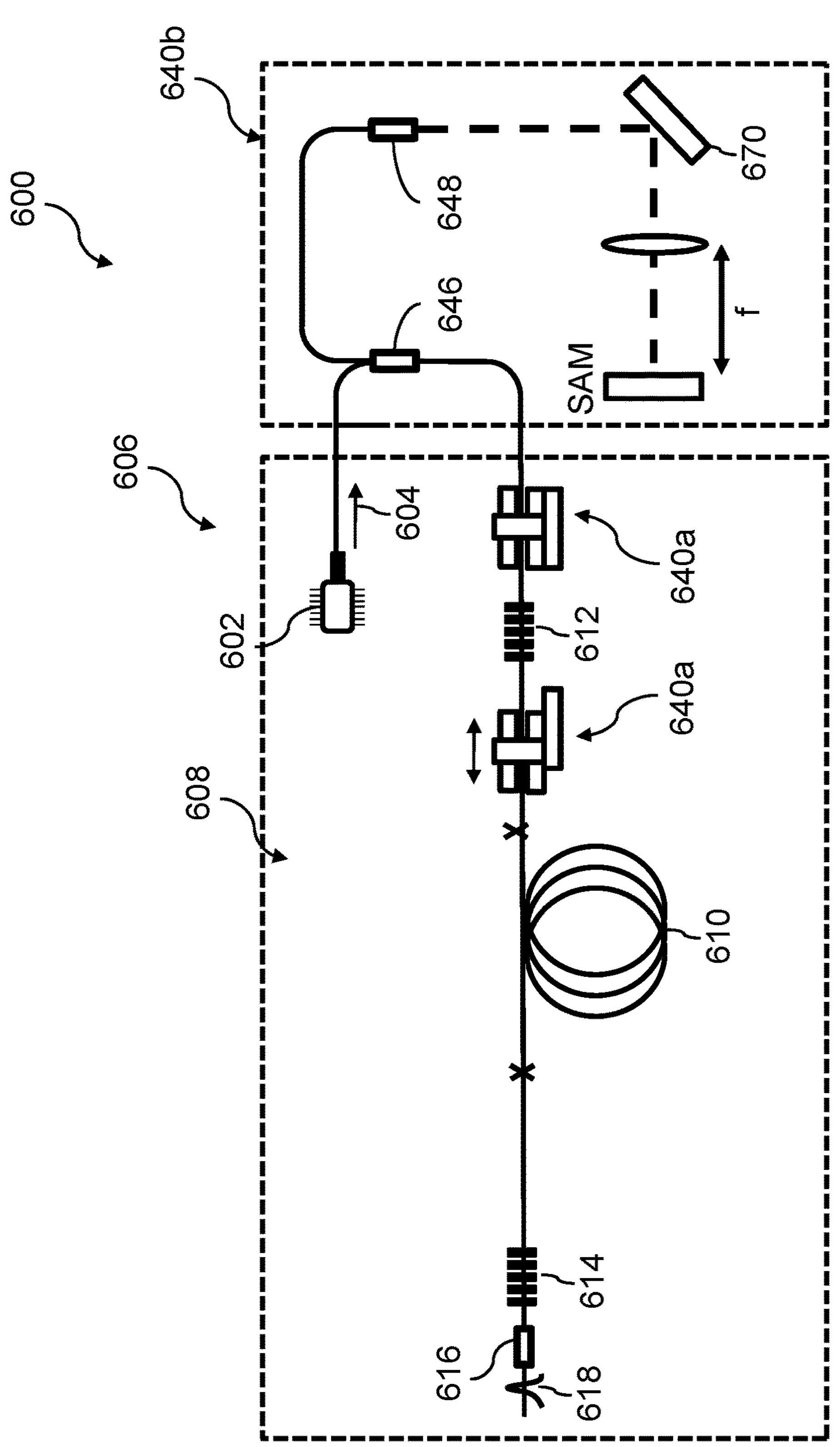
FIG. 8 is a schematic view of another example of a fiber laser system, with a laser cavity having a fiber-active laser region being sandwiched between first and second chirped fiber Bragg gratings, with first and second mode locking devices, in accordance with an embodiment.

At first glance, the fiber laser system 600, shown in FIG. 8, may look like a standard continuous wave fiber (CW) laser. It is entirely made up of PM fibers. A 10.8-m-long small core erbium-doped fiber 610 (EDF07-PM SR from OFS) provides gain and normal dispersion at 1550 nm. At each end of the laser cavity 608, first and second CFBG 612 and 614 each acts as a ~5-nm bandwidth reflective filter. The CFBGs 612 and 614 are written in a standard passive fiber (SM15 from Fujikura) with a high level of photosensitivity. The two passive segments have an in-cavity total length of ~0.60 m. The group delay dispersion (GDD) for a single pass in the laser cavity 608 is estimated at 0.38 $ps^2$.

Figures 8A, 8B:
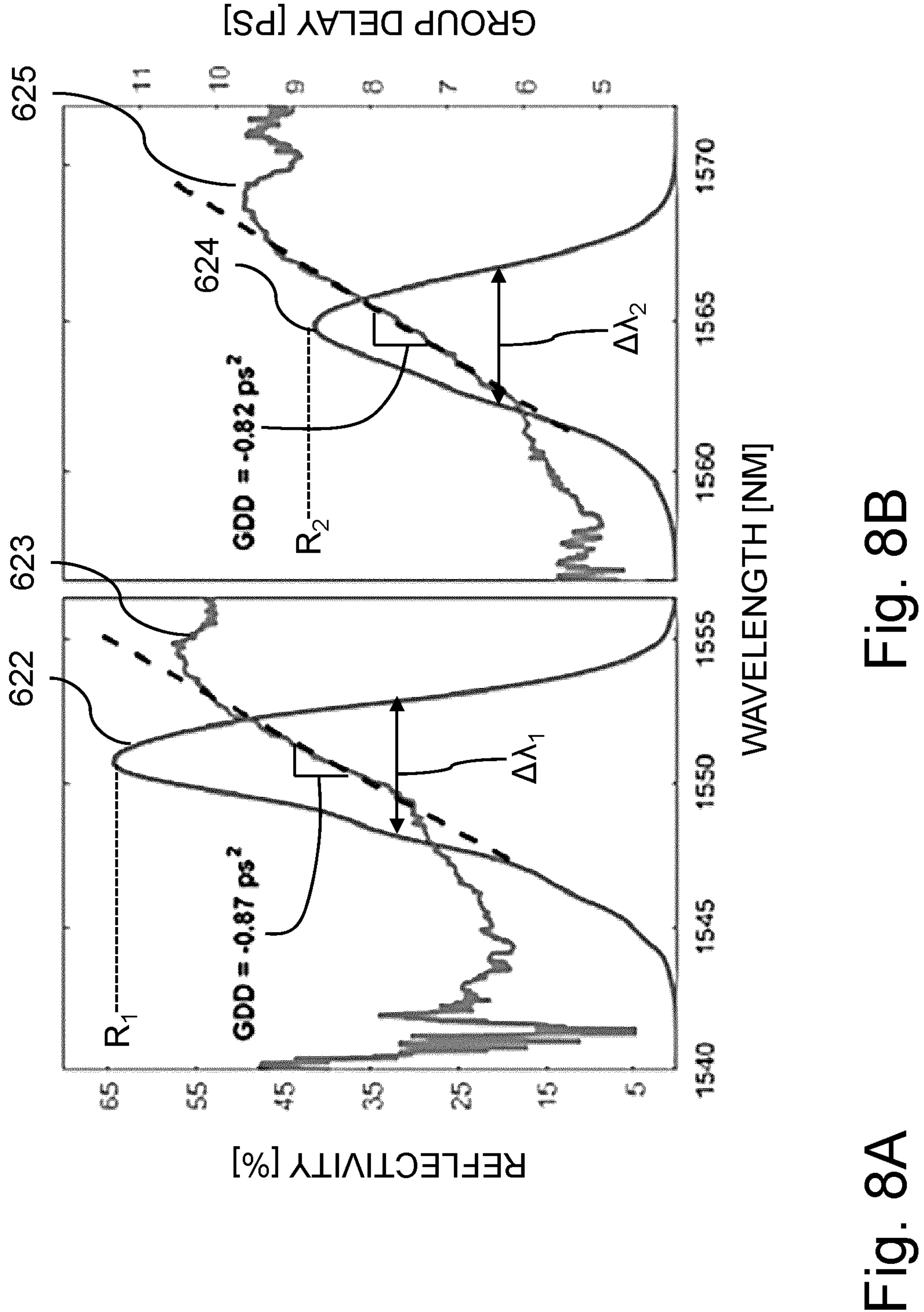
FIG. 8A is a graph showing a first reflectivity profile of the first chirped fiber Bragg grating of FIG. 8, with a full width at half maximum of 4.7 nm and a maximal reflectivity value of 65%, and showing a group delay dispersion of −0.87 $ps^2$.
FIG. 8B is a graph showing a second reflectivity profile of the second chirped fiber Bragg grating of FIG. 8, with a full width at half maximum of 4.5 nm and a maximal reflectivity value of 41%, and showing a group delay dispersion of −0.82 $ps^2$.

Measurements of the first and second reflectivity profiles 622 and 624 along with corresponding group delay dispersion of the CFBGs 612 and 614 are shown in FIGS. 8A-B. Their linear chirp and apodization were optimized through modeling to provide a smooth Gaussian reflective profile with minimal sidelobes, a relevant factor for maximizing the output pulse energy and mode locking stability. The CFBGs 612 and 614 have sidelobes at −30 dB (LR-CFBG) and −28 dB (HR-CFBG) relative to their respective maximal reflectivity values R1 and R2. They were UV-written with a chirped phase mask of 100 nm/cm. Very short inscription length with chirped Gaussian apodization (FWHM≅400 μm) and high index modulation (~$3\times10^{-3}$) are exploited to achieve high reflectivity with large bandwidth in this example. However, other methods of inscription can be used in some other embodiments. For given bandwidth and maximal index modulation, a chirped FBG yields a higher reflectivity than a uniform FBG, as discussed above. Deviation from a perfect Gaussian and asymmetry of the reflectivity profiles 622 and 624 may come from defects in the apodization profile. These small deviations also impact the group delay curves 623 and 625 that, otherwise, would be perfectly linear over the whole bandwidths Δλ. These artifacts were difficult to avoid since accurate inscription is a sizable challenge for sub-millimeter CFBGs with high index contrast.

A spectral detuning of 15 nm between the first and second reflectivity profiles 622 and 624 of the CFBGs 612 and 614 allows a spectrally broadened pulse with high peak power to survive in the laser cavity while any CW oscillation is suppressed. The fiber laser system behaves like an ideal nonlinear SA with a large modulation depth that favors high energy pulses. However, it also prevents self-starting from noise in some embodiments. In order to solve this problem, two stretching elements 640*a* set 12.5 cm apart are added to hold and stretch the 1550 nm HR-CFBG 622, which red-shifts the reflectivity curve of the corresponding grating. Once the filters are closer to each other, the SA's modulation depth is reduced and small noise fluctuations with low peak power can be transmitted through both filters, eventually leading to the formation of high-energy pulses.

This behaviour was not observed in this example. Rather, the laser cavity tends to emit CW when the spectral filter wings overlap in this specific embodiment. Thus, an external starting arm 640*b* was added to get reliable self-starting for this experiment. The arm 640*b* uses a saturable absorber mirror (SAM-1550-50-10 ps from BATOP GmbH) to induce a noisy Q-switching at 1565 nm with a feedback from the auxiliary output 648. Once a flip mirror 670 is put down, the laser cavity 608 immediately transitions toward a stable single pulse mode locked regime. At this stage, the stretching elements 640*a* can be used to tune the HR-CFBG 612 back and forth from 1550 to 1560 nm without losing mode locking. Even if this is not essential to the fiber laser system 600 described herein, it adds an interesting degree of freedom. A full characterization of the main output pulse 618 is shown in FIGS. 9A-9D along with a comparison with simulation results. The simulations account for self-phase-modulation (SPM), second-order dispersion (GVD), third-order dispersion (TOD) and spectral gain through the scalar generalized nonlinear Schrodinger equation. The measured reflectivity and dispersion profiles are directly used to represent both CFBGs 612 and 614. The gain is calculated from the erbium cross sections and the rate equations are solved in the steady state. In a linear configuration, the optical pulse 618 passes twice through each section of the optical gain region 610 at each round trip. The transition rates at each position along the fiber are thus computed taking into account the pulse energy as it goes toward the HR-CFBG 612 and the pulse energy of its reflected counterpart going toward the LR-CFBG 614.

Figures 9A, 9B, 9C, 9D:
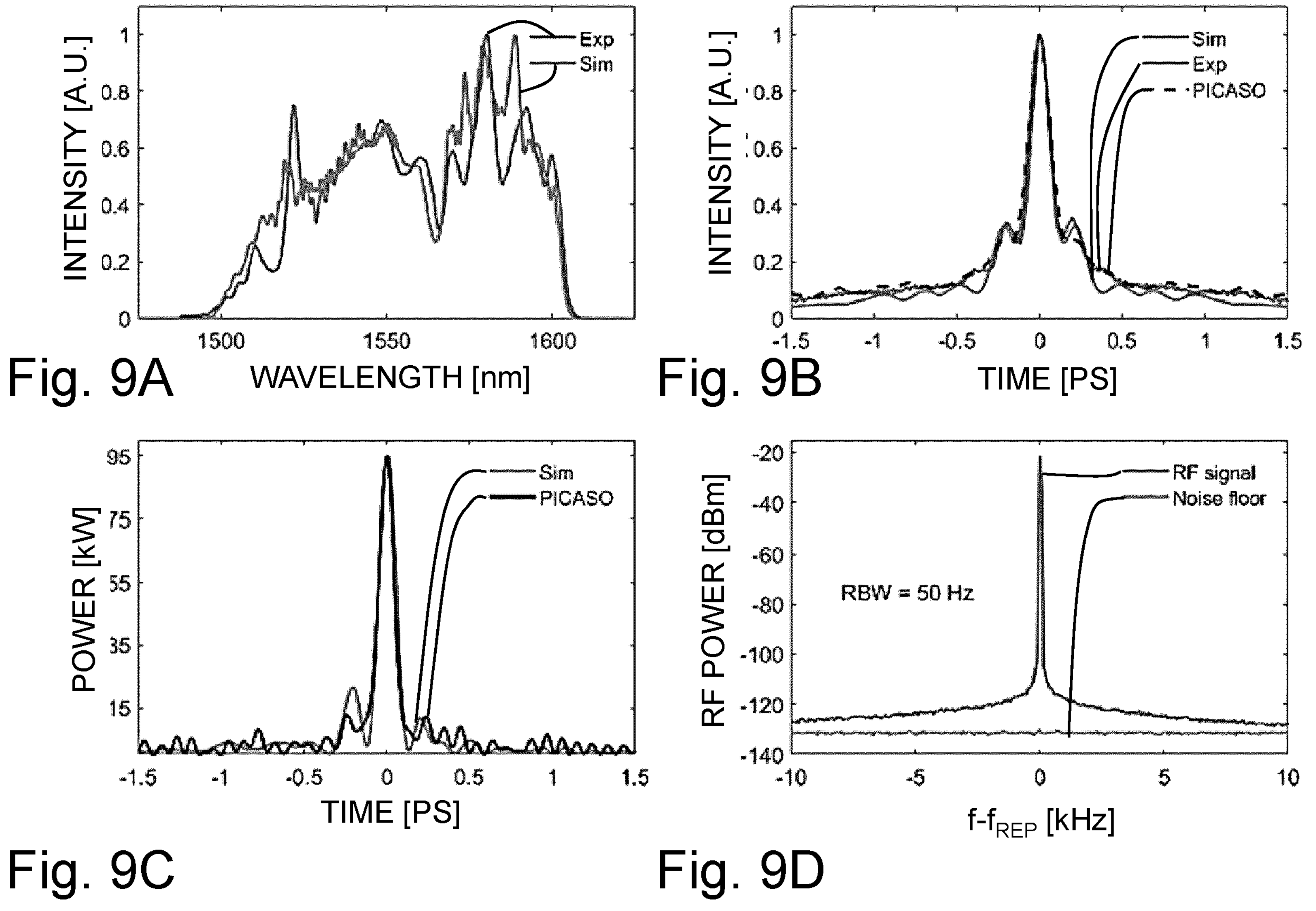
FIG. 9A is a graph showing simulated and experimental spectra of optical pulses generated by the fiber laser system of FIG. 8.
FIG. 9B is a graph showing simulated and experimental autocorrelation traces of optical pulses generated by the fiber laser system of FIG. 8.
FIG. 9C is a graph showing simulated and measured pulse envelope after compression for optical pulses generated by the fiber laser system of FIG. 8.
FIG. 9D is a graph showing a radio frequency spectrum compared to noise for optical pulses generated by the fiber laser system of FIG. 8.

A stable 21.3-nJ pulse train at 8.935 MHz is observed on the radio frequency spectrum with an average power of 190 mW. The injected pump power is 850 mW for an excellent 22.3% power conversion efficiency. The pulse energy is limited by the injected pump power. On the secondary output 648, a pulse of 11.7 nJ is observed. By design, most of the energy is extracted by the pulse co-propagating with the pump laser beam 604. The main output's broad spectrum can support transform-limited pulses of 74 fs. The 15 cm segment of anomalous GVD passive fiber at the main output 618 of the laser cavity 608 is partially responsible for the spectral modulations shown in FIG. 9A and helps replenishing the spectral hole left behind by the LR-CFBG 614. It is interesting to note that no polarizer is required in the laser cavity 608. The fiber laser system 600 naturally chooses one linear polarization state among the two orthogonal modes of the PM fiber, as can be seen by analyzing the main output 618. With a polarizer, an extinction ratio of −20 dB was measured. This self-polarizing effect is caused by the advantageous contribution of SPM over cross-phase modulation (XPM) to the spectral broadening. A vectorial version of the numerical model also showed this dynamic even without considering the group delay difference between the fast and slow axis of the fiber. In the experimental setup, the birefringent fiber is essential to prevent any disruption to the polarization state. It also contributes to a greatly improved robustness to environmental perturbations: touching or bending the fiber had no effect on the mode locked state or output pulse characteristics. The pulses were dechirped (or compressed) with a grating pair compressor (600 lines/mm) and the autocorrelation trace is shown in FIG. 9B. The PICASSO algorithm was used to get an accurate reconstruction of the pulse envelope. The compressed pulse peak power was estimated to be 95 kW with a FWHM duration of 108 fs. If the 50% loss in the compressor is taken into consideration, the actual experimental peak power is 47.5 kW. In addition to this, a significant fraction of the pulse energy is lost in side lobes spread over 3 ps. This results from a nonlinear, although smooth, variation of the output pulse instantaneous frequency. Potential phase noise coming from the CFBGs is not important here since the 4.7 nm bandwidth cannot strongly affect the 115-nm spanning spectrum after full nonlinear broadening. Excellent agreement with the numerical results provides validations of both the measurements and the numerical model. This gives us the opportunity of further exploring the pulse dynamics inside the laser cavity 608 and the impact of the GDD of the CFBGs 612 and 614.

Figures 10A, 10B:
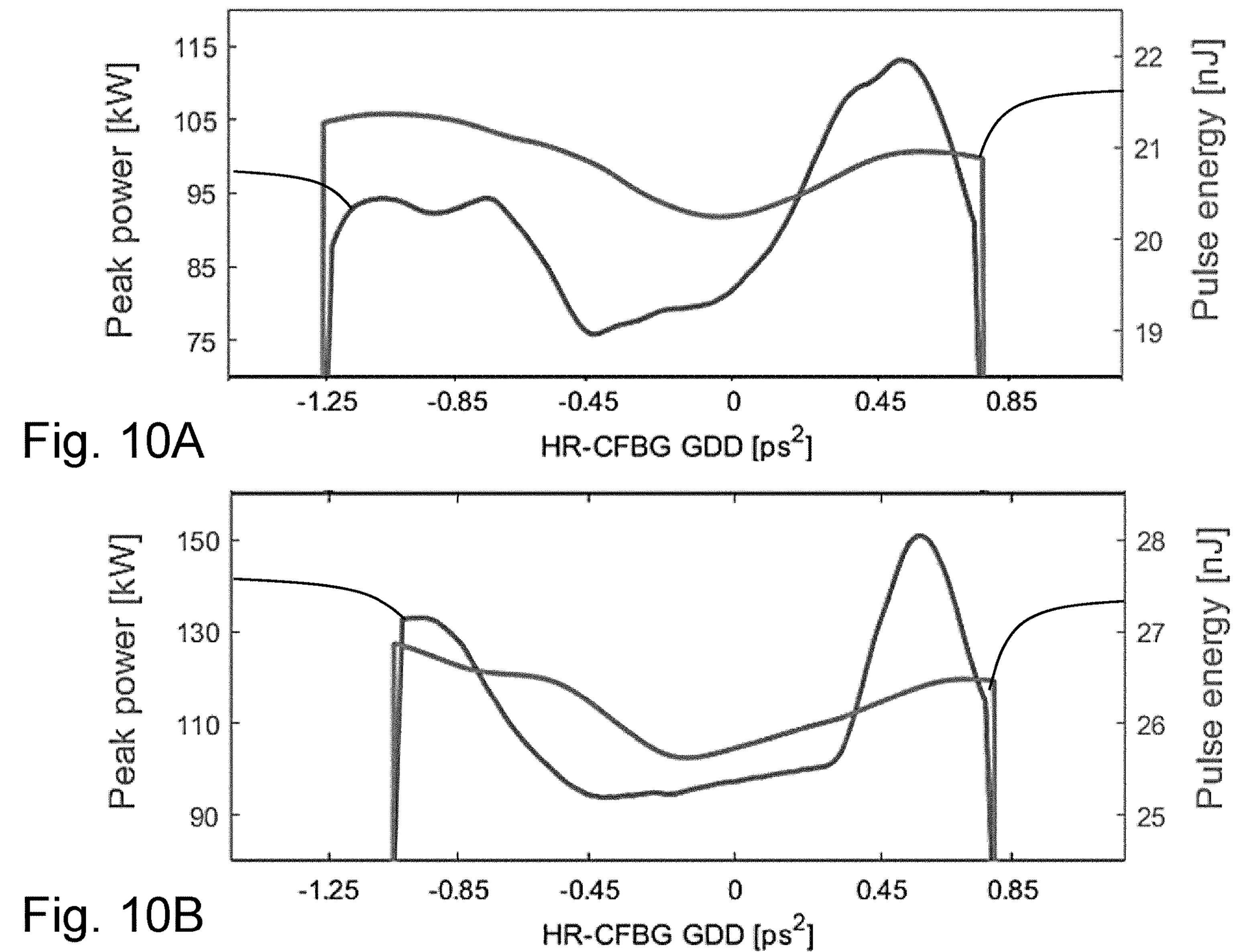
FIG. 10A is a graph showing simulations for peak power and pulse energy for optical pulses after compensation of the second-order dispersion as a function of the first chirped fiber Bragg grating for a second chirped fiber Bragg grating having a maximal reflectivity value of 41%.
FIG. 10B is a graph showing simulations for peak power and pulse energy for optical pulses after compensation of the second-order dispersion as a function of the first chirped fiber Bragg grating for a second chirped fiber Bragg grating having a maximal reflectivity value of 15%.

Through simulations, the impact of the dispersion of the HR-CFBG 612 on the laser cavity 608 was studied over a wide range of GDD and for two values of reflectivity of the LR-CFBG 614. For this analysis, both filters' reflectivity parameters are considered to be perfectly Gaussian with 4.5 nm bandwidth. The passive fiber after the LR-CFBG 614 at the main output 618 is not taken into account. All results are taken when the laser cavity 608 reaches the steady state. FIGS. 10A-10B show the pulse energy and its peak power after optimal compression via compensation of second-order dispersion as a function of the HR-CFBG's GDD. FIG. 10A is essentially the same as this experimental setup while case FIG. 10B shows the impact of a lower LR-CFBG reflectivity without dispersion. It can be appreciated that as long as the GDD increases, in either the normal dispersion regime or the anomalous dispersion region, the pulse energy also increases.

In steady state, the main pulse and its reflected counterpart share the same local gain along the fiber. For that reason, both of their nonlinear evolution and amplification process are coupled to each other through the longitudinal gain profile. To demonstrate this effect, FIG. 10A shows that a lower LR-CFBG reflectivity without dispersion could give a significant improvement on the main pulse energy by giving it less competition on the energy extraction and by cutting a lesser portion of the spectrum. However, the filter dispersion does not cause a loss of energy inside the cavity and only slightly affects the pulse energy. This small perturbation results from a modified nonlinear spectrum broadening which affects the wavelength-dependent gain along the fiber.

The cavity can support higher dispersion in the negative GDD region. With the 41% LR-CFBG, the difference is 0.5 $ps^2$ which is similar to the single pass GDD. When negative, the CFBG dispersion has to compensate for the positive chirp accumulated along the fiber. This means a weaker inhibition of the initial peak power and pulse's nonlinear broadening for a higher anomalous dispersion. For the same reason, a cavity with lower LR-CFBG reflectivity will tolerate smaller maximum filter dispersion.

Figures 11A, 11B, 11C:
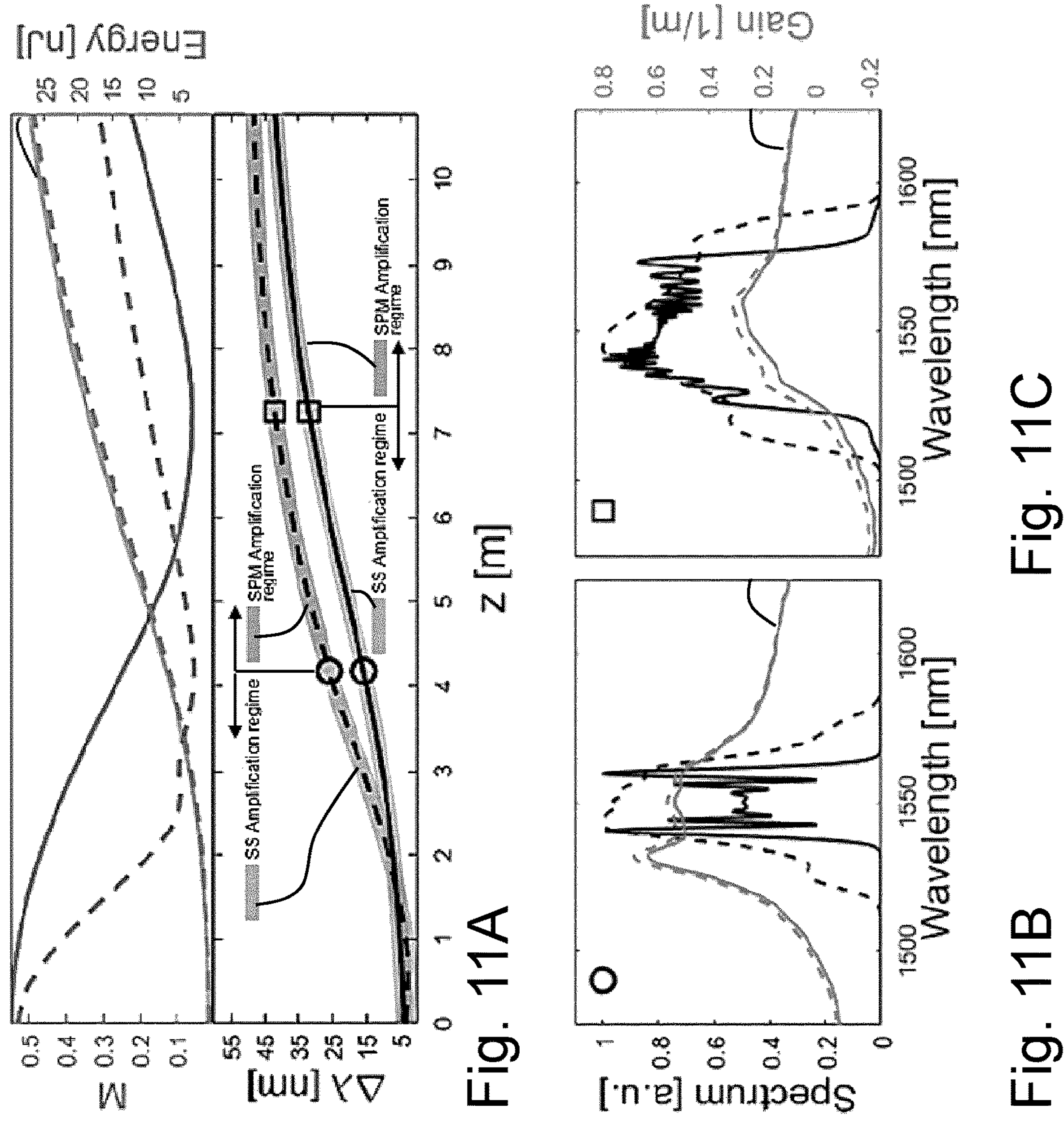
FIG. 11A is a graph showing an example evolution of a pulse parabolic misfit parameter $M^2=\int(I-I_{fit})^2dt/\int I^2dt$ as a function of the length of the fiber-active doped region of the fiber laser system of FIG. 8.
FIG. 11B is a graph showing pulse and gain spectra of optical pulses at a first longitudinal position along the length of the fiber-active doped region of the fiber laser system of FIG. 8.
FIG. 11C is a graph showing pulse and gain spectra of optical pulses at a second longitudinal position spaced-apart from said first longitudinal position.

Higher peak power after compression indicates a more linear initial chirp and a smoother spectrum leading to a lower energy lost in the sidelobes of the compressed pulse. In this example, the simulation shows that a positive GDD value of +0.55 $ps^2$ is optimal for the output pulse compressibility. In practice, with such a low GDD, CFBGs with good properties could not be achieved since there is a limitation in terms of maximum index modulation. More dispersion means that a higher peak reflectivity can be achieved by the inscription of a longer CFBG with a smaller chirp for the same maximum refractive index modulation and bandwidth. Thus, it is operated in a higher optimal anomalous GDD in order obtain the necessary bandwidth and reflectivity to keep a high pulse energy. Operating the CFBG with a higher negative GDD has other positive side effects. First, the pulse avoids losses from coupling with the fiber's cladding modes that can result from operating in positive GDD. Secondly, simulation indicates that higher dispersion can mitigate the impact of asymmetries in the filter shape that are bound to arise from imperfections in the inscription. Overall, the results of FIGS. 10A-10B suggest the possibility of tailoring the nonlinear pulse evolution without a major effect on the output pulse energy. The general trend to remember is that a moderate amount of filter dispersion (positive or negative) is beneficial. To further understand the underlying dynamics behind this, simulation results in FIGS. 11A-11C compare the pulse evolution inside the gain fiber between the worst and the optimal HR-CFBG GDD values. The solid lines show the evolution of the pulse parabolic misfit parameter, the pulse energy, and the pulse bandwidth when chirped fiber Bragg gratings are used. The dashed lines show the evolution of those parameters when the fiber Bragg gratings are not chirped for comparison.

It is interesting to notice that the pulse energy grows in a similar manner for both cases. Even with significant manipulation of the nonlinear dynamics, the filter dispersion does not strongly affect the pulse energy because the saturated gain distribution in the steady state will roughly remain the same for a fixed pump power and reflectivities of the CFBGs. The evolution of the misfit parameter M shows two different nonlinear regimes. First, the pulse parameters follow an exponential growth (energy, RMS bandwidth, etc.) until a minimal M value is reached. This is typical for a self-similar (SS) regime which attracts any input pulse toward a parabolic shape. Secondly, the spectrum broadens and eventually hits the gain bandwidth limit which stops the nonlinear attractor. The pulse shifts into a simple SPM and gain regime where the linear chirp starts to bend as the pulse slowly loses his parabolic shape due to the gain bandwidth effect. This state has a similar behaviour than the transitional state between the self-similar and gain-managed nonlinearity (GMN) regimes since the blue part of the broadened spectrum undergoes some absorption. This is expressed by a saturation of the pulse spectrum RMS bandwidth toward the fiber end. Stretching the pulse before amplification reduces the initial peak power and slows down the spectral broadening. As a result, the inflection point between the two regimes is pushed further along the fiber. By reducing the SPM amplification regime length of action, the output pulse chirp is more linear. On the other hand, it is expected to observe a slower rate of convergence to the parabolic shape for an initial pulse with higher chirp and duration. This also results in a spectrum which is not as smooth in most of the amplifier length. If this effect becomes too strong, the smooth nonlinear evolution brought by the self-similar regime cannot take place. Prohibited from achieving a parabolic shape, the pulse is undermined by optical wave breaking and the cavity becomes unstable. This explains the dispersion upper-limits observed in FIGS. 10A-10B. The best GDD value gives the optimal trade-off between the bandwidth effect and weaker self-similar regime.

To conclude this example, an all-fiber Mamyshev oscillator is proposed which emits 21.3-nJ pulses compressible to 108 fs with an efficiency of 22.3% relative to the launched pump power. This achievement was made possible through the use of sub-millimeter Gaussian-shaped and chirped fiber Bragg gratings as spectral filters at the extremities of a linear cavity. The chirp of the gratings is essential to be able to fabricate high-reflectivity Gaussian filters with the bandwidth required in an MO. The chirp also provides the opportunity of controlling the dispersion of the filters, which has an important impact on the nonlinear evolution of the pulse in an MO. It was shown in this example that an amount of filter GDD comparable to the fiber GDD is beneficial to obtain larger pulse peak power without affecting the pulse energy. This might be a first step toward more complex pulse shaping schemes in Mamyshev oscillators. Arguably, this is the simplest ultrafast fiber laser architecture so far and still it yielded competitive results in terms of pulse energy, duration and peak power. This paves the way to accessibility and cost effectiveness which will enable many applications requiring high-energy pulses. Since it is compatible with high power requirements, this approach also shows potential to bring the MW power level of the ytterbium-based fiber MO to an all-fiber format.

In the following examples, the index modulation used in the grating inscription process is given by the following equation:

$$n(z)=n_0+\max(A)+A(z)\cos(z/\Lambda(z)), \quad (1)$$

where z represents the longitudinal position along the fiber, A is the apodization profile, $n_o$ is the initial index of the fiber and $\Lambda$ is the grating period.

Figures 12A, 12B:
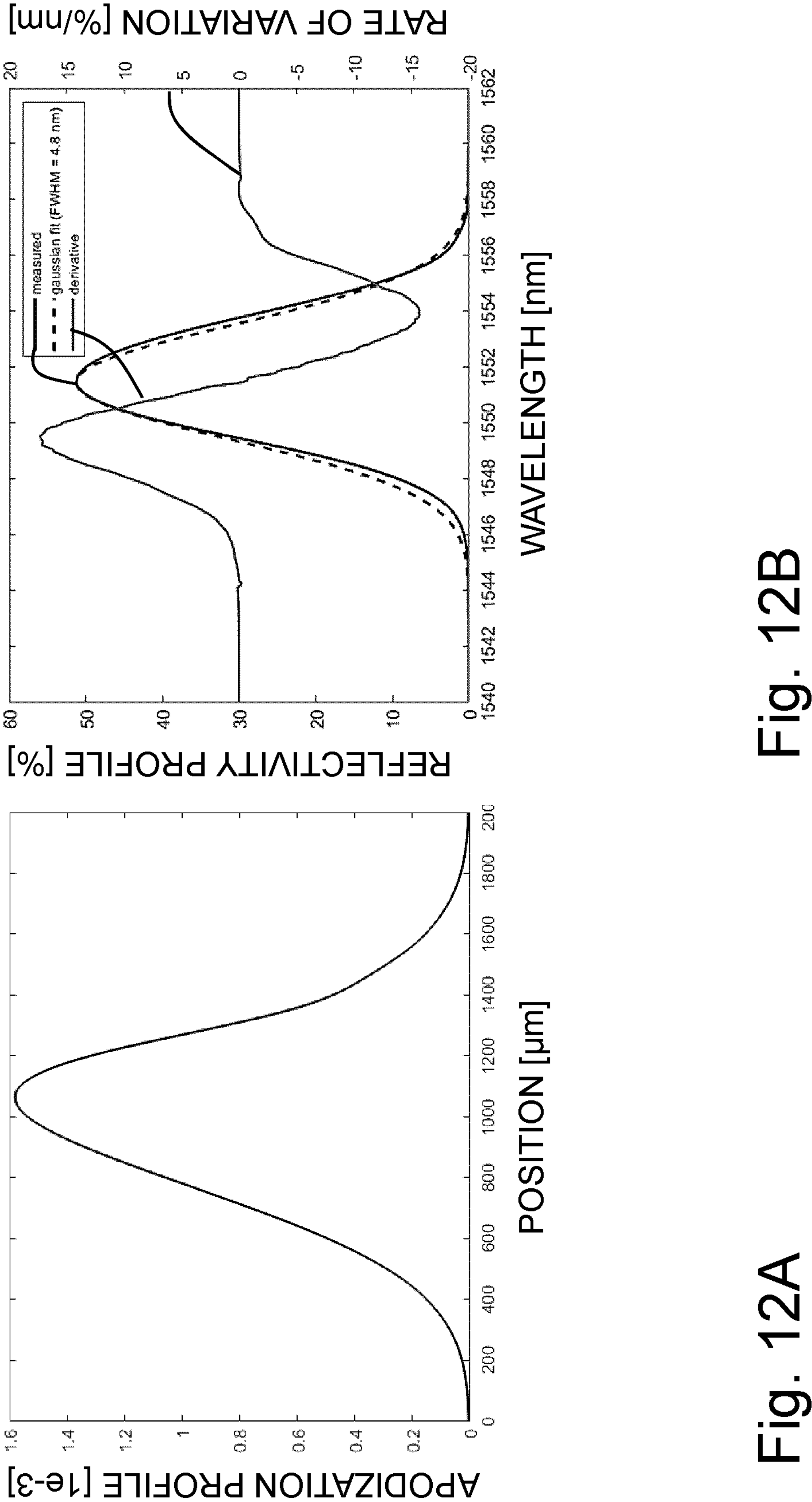
FIG. 12A is a graph showing another example of a refractive index profile of a fiber Bragg grating operating at 1552 nm in an erbium-based laser cavity, in accordance with one or more embodiments.
FIG. 12B is a graph showing an example reflectivity profile of the fiber Bragg grating of FIG. 12A, in accordance with one or more embodiments.

Example 2—Fiber Bragg Grating Operating at 1552 nm in an Erbium-Based Laser Cavity FIG. 12A shows an example of a fiber Bragg grating designed to obtain Gaussian-like reflectivity profile near about 1552 nm for an erbium-based laser cavity. In this specific example, the grating is inscribed with specific apodization and a linear chirped phase mask period of 65 nm/cm. Measured grating was inscribed in the fiber PM980-XP from Nufern. FIG. 12B shows the measured reflectivity profile of that fiber Bragg grating. In this specific example, the length of the fiber Bragg grating along the z-axis is about 2000 μm, the apodization profile A that is Gaussian-like as shown at FIG. 12A, the initial index $n_o$ is 1.44897, the grating period is given by $\Lambda(z)$=0.362 um+z*(32.5 nm/cm), where z denotes the center of the apodization profile. These specific values are given as examples only and are non-limiting as they can differ from one embodiment to another.

Example 3—Fiber Bragg Grating Operating at 1050 nm in an Ytterbium-Based Laser Cavity FIG. 13A shows another example of a fiber Bragg grating. In this specific example, the fiber Bragg grating is designed to exhibit a Gaussian-like reflectivity profile near about 1050 nm for an ytterbium-based laser cavity. The grating is inscribed with specific apodization and a uniform grating period, and was inscribed in the fiber Liekki Passive-10/125DC-PM from nLIGHT. FIG. 13B shows the measured reflectivity profile of that fiber Bragg grating. In this specific example, the length of the fiber Bragg grating along the z-axis is about 700 μm, the apodization profile A that is Gaussian-like as shown at FIG. 13A, the initial index $n_o$ is 1.45201, the grating period $\Lambda$ is 0.535 μm. These specific values are given as examples only and are non-limiting as they can differ from one embodiment to another.

As can be understood, the examples described above and illustrated are intended to be exemplary only. For instance, the first fiber Bragg grating may not be a fiber Bragg grating in some embodiments. In these embodiments, the laser system can have a pump laser, and a laser cavity optically coupled to the pump laser. The first fiber Bragg grating may have a uniform grating period in some embodiments. In some embodiments, the laser cavity may be fibered. The laser cavity has a cavity path, a first filter having a first filter profile of a Gaussian-like shape, a second filter having a second filter profile, and an optical gain region between the first and second filters along the cavity path. As in any Mamyshev oscillator, the first and second filter profiles are spectrally detuned from one another. However, in this embodiment, the first filter is a dispersive filter thereby imparting a dispersive profile across at least at portion of the first filter profile. As such, when the optical gain region is pumped with the pump laser, and when laser cavity is mode locked, optical pulses of satisfactory pulse energy and compressibility quality can circulate within the laser cavity, and then outside the cavity via an output. In these embodiments, the first filter can be a dispersive filter of any suitable type including, but not limited to, Bragg filters, volume Bragg filters, fiber Bragg gratings, three dimensional Bragg filters and the like. The scope is indicated by the appended claims.

What is claimed is:

1. A fiber laser system comprising:

a pump laser generating a pump laser beam; and a length of optical fiber optically coupled to the pump laser, the length of optical fiber having:

a laser cavity having a cavity path, a first fiber Bragg grating having a first reflectivity profile, a second filter having a second filter profile, and an optical gain region between the first fiber Bragg grating and the second filter along the cavity path, the first reflectivity profile being spectrally detuned from the second filter profile, the first reflectivity profile and the second filter profile being one of: spectrally non-overlapping, and spectrally overlapping only to the extent that adjacent tails of the first reflectivity profile and the second filter profile overlap with one another, the first fiber Bragg grating having a first refractive index profile comprising a full width at half maximum bandwidth of at least 0.2 nm and a Gaussian-like apodization, wherein, upon pumping of the optical gain region with the pump laser beam and mode locking of the laser cavity, optical pulses are circulated along the cavity path; and an output optically coupled to the laser cavity and outputting at least a portion of the optical pulses.

2. The fiber laser system of claim 1 wherein the first reflectivity profile of the first fiber Bragg grating has a maximal reflectivity value of at least 40% and the full width at half maximum bandwidth is of at least 0.5 nm.

3. The fiber laser system of claim 2 wherein the maximal reflectivity value of the first reflectivity profile is at least 50%.

4. The fiber laser system of claim 2 wherein the full width at half maximum bandwidth of the first reflectivity profile is between about 4 nm and about 5 nm.

5. The fiber laser system of claim 1 wherein the first refractive index profile has a varying grating period.

6. The fiber laser system of claim 5 wherein the varying grating period of of the first refractive index profile varies in a linear manner, thereby offering a linear group delay dispersion across the first reflectivity profile.

7. The fiber laser system of claim 6 wherein the linear group delay dispersion is steeper than $\pm 0.5$ $ps^2$.

8. The fiber laser system of claim 6 wherein the linear group delay dispersion of the varying grating period is at least twice as steep as a linear group delay dispersion offered by the optical gain region.

9. The fiber laser system of claim 1 wherein the second filter profile has a maximal reflectivity or transmissivity value being smaller than a maximal reflectivity value of the first reflectivity profile, the output being optically coupled to the second filter.

10. The fiber laser system of claim 1 wherein the second filter is a second fiber Bragg grating, the second filter profile being a second reflectivity profile spectrally detuned from the first reflectivity profile.

11. The fiber laser system of claim 10 wherein the first and second fiber Bragg gratings sandwich at least a portion of the optical gain region along the cavity path, the cavity path thereby being a linear path along which the optical pulses are reflected in back-and-forth between the first and second fiber Bragg gratings.

12. The fiber laser system of claim 1 wherein the second filter profile has a varying grating period.

13. The fiber laser system of claim 1 further comprising a mode locking device coupled to the length of optical fiber and contributing to said mode locking of said laser cavity.

14. The fiber laser system of claim 13 wherein the mode locking device has a stretching element longitudinally stretching at least one of the first fiber Bragg grating and the second filter, thereby modifying a spectral detuning between the first reflectivity profile and the second filter profile.

15. The fiber laser system of claim 1 wherein the outputted optical pulses have a similariton-like profile having a linearly varying instantaneous frequency and a pulse duration below 100 fs after compression.

16. The fiber laser system of claim 1 further comprising a tilted fiber Bragg grating in the cavity path within the laser cavity.

17. A laser system comprising:

a pump laser generating a pump laser beam;

a laser cavity optically coupled to the pump laser, the laser cavity having a cavity path, a first filter having a first filter profile of a Gaussian-like shape, a second filter having a second filter profile, and an optical gain region between the first and second filters along the cavity path, the first and second filter profiles being spectrally detuned from one another, the first reflectivity profile and the second filter profile being one of: spectrally non-overlapping, and spectrally overlapping only to the extent that adjacent tails of the first reflectivity profile and the second filter profile overlap with one another, the first filter being dispersive thereby imparting a dispersive profile across at least at portion of the first filter profile, wherein, upon pumping of the optical gain region with the pump laser beam and mode locking of the laser cavity, optical pulses are circulated along the cavity path; and an output optically coupled to the laser cavity and outputting at least a portion of the optical pulses.

18. The laser system of claim 17 wherein the first filter is a fiber Bragg grating has an refractive index profile comprising a full width at half maximum bandwidth of at least 0.2 nm and a Gaussian-like apodization.

19. The laser system of claim 18 wherein the refractive index profile has a varying grating period.

20. The laser system of claim 17 wherein at least a portion of the laser cavity is fibered.

* * * * *